(12) United States Patent
Zheng

(10) Patent No.: US 10,530,744 B2
(45) Date of Patent: Jan. 7, 2020

(54) MESSAGE PROCESSING METHOD, ACCESS CONTROLLER, AND NETWORK NODE

(71) Applicant: Huawei Technologies Co., Ltd., Shenzhen (CN)

(72) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 409 days.

(21) Appl. No.: 15/260,740

(22) Filed: Sep. 9, 2016

(65) Prior Publication Data
US 2017/0005980 A1    Jan. 5, 2017

Related U.S. Application Data

(63) Continuation of application No. PCT/CN2015/073304, filed on Feb. 26, 2015.

(30) Foreign Application Priority Data

Mar. 11, 2014 (CN) .......................... 2014 1 0088000

(51) Int. Cl.
*H04L 29/12* (2006.01)
*H04L 29/06* (2006.01)

(52) U.S. Cl.
CPC .......... *H04L 61/203* (2013.01); *H04L 61/103* (2013.01); *H04L 61/2015* (2013.01); *H04L 63/0892* (2013.01); *H04L 63/10* (2013.01)

(58) Field of Classification Search
CPC . H04L 61/203; H04L 61/103; H04L 61/2015; H04L 63/0892; H04L 63/10
See application file for complete search history.

(56) References Cited

U.S. PATENT DOCUMENTS 8,705,471 B2 * 4/2014 Zhao ................. H04L 29/12028
370/329
8,917,723 B2    12/2014 Zheng
(Continued)

FOREIGN PATENT DOCUMENTS

CN    1968087 A    5/2007
CN    1984499 A    6/2007
(Continued)

OTHER PUBLICATIONS

International Search Report issued in International Application No. PCT/CN2015/073304, dated May 29, 2015, 12 pages.
(Continued)

*Primary Examiner* — Saleh Najjar
*Assistant Examiner* — Louis C Teng
(74) *Attorney, Agent, or Firm* — Fish & Richardson P.C.

(57) ABSTRACT

This application provides a message processing method, an access controller, and a network node. In some aspects, an access controller receives a first message used to obtain Internet Protocol (IP) address information for a user-side device and a first access loop identifier of a first network node, where the first message and the first access loop identifier are sent by the first network node, the first access loop identifier is not carried in the first message. The access controller obtains an authentication, authorization and accounting (AAA) message according to the first access loop identifier, wherein the AAA message comprises the first access loop identifier. The access controller sends the AAA message to an AAA server.

14 Claims, 10 Drawing Sheets

(56) References Cited

U.S. PATENT DOCUMENTS

| | | | |
|---|---|---|---|
| 2007/0076607 A1 | 4/2007 | Voit et al. | |
| 2007/0258464 A1* | 11/2007 | Hall | H04L 12/2856 370/395.52 |
| 2008/0298809 A1 | 12/2008 | Zheng | |
| 2010/0202450 A1* | 8/2010 | Ansari | G06Q 30/04 370/389 |
| 2011/0002342 A1* | 1/2011 | Zheng | H04L 63/08 370/401 |
| 2012/0099861 A1* | 4/2012 | Zheng | H04L 45/68 398/45 |
| 2012/0106468 A1 | 5/2012 | Engstrom | |
| 2012/0207060 A1* | 8/2012 | Zhao | H04L 29/12028 370/255 |
| 2014/0143428 A1* | 5/2014 | Zheng | H04W 12/08 709/226 |
| 2015/0095991 A1* | 4/2015 | Zheng | H04L 63/08 726/4 |
| 2015/0188812 A1* | 7/2015 | Zheng | H04Q 11/00 398/45 |
| 2015/0205991 A1* | 7/2015 | Park | H04W 4/046 340/10.3 |
| 2017/0331749 A1* | 11/2017 | Zhang | H04L 45/306 |
| 2018/0341447 A1* | 11/2018 | Asai | G06F 3/1204 |

FOREIGN PATENT DOCUMENTS

| | | |
|---|---|---|
| CN | 101316257 A | 12/2008 |
| CN | 101516048 A | 8/2009 |
| CN | 101547383 A | 9/2009 |
| CN | 102088391 A | 12/2009 |
| CN | 102088391 A | 6/2011 |
| CN | 103210630 A | 7/2013 |
| WO | 2012163178 A1 | 12/2012 |

OTHER PUBLICATIONS

Office Action issued in Chinese Application No. 201410088000.1 dated Sep. 20, 2017; 20 pages.

Extended European Search Report issued in European Application No. 15761952.9 dated Jun. 21, 2017; 6 pages.

International Search Report issued in International Application No. PCT/CN2015/073304, dated May 29, 2015, 4 pages.

* cited by examiner

MESSAGE PROCESSING METHOD, ACCESS CONTROLLER, AND NETWORK NODE

CROSS-REFERENCE TO RELATED APPLICATIONS

This application is a continuation of International Application No. PCT/CN2015/073304, filed on Feb. 26, 2015, which claims priority to Chinese Patent Application No. 201410088000.1, filed on Mar. 11, 2014, both of which are hereby incorporated by reference in their entireties.

TECHNICAL FIELD

This application relates to the field of communications technologies, and in particular, to a message processing method, an access controller, and a network node.

BACKGROUND

In a current access network, there are massive network devices, such as a digital subscriber line access multiplexer (DSLAM), an optical network unit (ONU), an optical line terminal (OLT), a router, a broadband network gateway (BNG), a switch, and a broadband remote access server. When these network devices are located on a propagation path for a message, each of these network devices needs to support a function of processing an access loop identifier carried in the message. A format and contents of the access loop identifier vary slightly with each operator. Therefore, all these network devices need to be customized for different operators.

SUMMARY

This application provides a message processing method, an access controller, and a network node, to resolve a technical problem of great operation and maintenance complexity for a network device in the prior art.

A first aspect of this application provides a message processing method, including receiving, by an access controller, a first message used to obtain Internet Protocol (IP) address information for a user-side device and a first access loop identifier of a first network node, where the first message and the first access loop identifier are sent by the first network node, the first access loop identifier is not carried in the first message, and the IP address information includes an IP address or an IP address prefix; obtaining, by the access controller, first IP address information for the user-side device based on the first access loop identifier, where the first IP address information includes a first IP address or a first IP address prefix; and sending, by the access controller, the first IP address information to the first network node.

With reference to the first aspect, in a first possible implementation manner of the first aspect, the obtaining, by the access controller, the first IP address information based on the first access loop identifier includes: sending, by the access controller, either the first access loop identifier or the first access loop identifier and a second access loop identifier of a second network node to an authentication, authorization and accounting (AAA) server, where the second network node and the first network node belong to a same data packet forwarding path, and the second access loop identifier is determined according to the first access loop identifier and a correspondence between the first access loop identifier and the second access loop identifier; receiving, by the access controller, authorization information sent by the AAA server; and obtaining or allocating, by the access controller, the first IP address information based on the authorization information.

With reference to the first aspect, in a second possible implementation manner of the first aspect, the obtaining, by the access controller, the first IP address information for the user-side device based on the first access loop identifier includes: sending, by the access controller, either the first access loop identifier or the first access loop identifier and a second access loop identifier of a second network node to an address allocation node, where the address allocation node includes an IP edge node, a Dynamic Host Configuration Protocol (DHCP) server, or an authentication, authorization and accounting (AAA) server, the second network node and the first network node belong to a same data packet forwarding path, and the second access loop identifier is determined according to the first access loop identifier and a correspondence between the first access loop identifier and the second access loop identifier; and receiving, by the access controller, the first IP address information sent by the address allocation node.

With reference to the first aspect, in a third possible implementation manner of the first aspect, the sending, by the access controller, either the first access loop identifier or the first access loop identifier and a second access loop identifier of a second network node to an address allocation node includes adding, by the access controller, either the first access loop identifier or the first access loop identifier and the second access loop identifier to the first message, to form a second message; and sending, by the access controller, the second message to the address allocation node; or the sending, by the access controller, either the first access loop identifier or the first access loop identifier and a second access loop identifier of a second network node to an address allocation node includes creating, by the access controller, a second message, where the second message carries the first access loop identifier or carries the first access loop identifier and the second access loop identifier; and sending, by the access controller, the second message to the address allocation node.

With reference to the first aspect or any one of the first possible implementation manner of the first aspect to the third possible implementation manner of the first aspect, in a fourth possible implementation manner of the first aspect, the method further includes: receiving, by the access controller, a Media Access Control (MAC) address of the user-side device that is sent by the first network node; forming, by the access controller, a mapping relationship between the first IP address information and the MAC address according to the obtained first IP address information and the MAC address; and sending, by the access controller, the mapping relationship to the first network node.

With reference to the first aspect or any one of the first possible implementation manner of the first aspect to the fourth possible implementation manner of the first aspect, in a fifth possible implementation manner of the first aspect, the first message and the first access loop identifier are included in an OpenFlow message.

With reference to the first aspect or any one of the first possible implementation manner of the first aspect to the fifth possible implementation manner of the first aspect, in a sixth possible implementation manner of the first aspect, the first network node is an access node (AN), and the user-side device is customer-premises equipment (CPE); or the first network node is an optical network unit (ONU), and the user-side device is CPE; or the first network node is CPE, and the user-side device is user equipment (UE) connected to the CPE.

A second aspect of this application further provides a message processing method, including receiving, by a first network node, a first message that is used to obtain Internet Protocol (IP) address information for a user-side device and is sent by the user-side device, where the IP address information includes an IP address or an IP address prefix; sending, by the first network node, the first message and a first access loop identifier of the first network node to an access controller, where the first access loop identifier is not carried in the first message; receiving, by the first network node, first IP address information that is obtained for the user-side device and is sent by the access controller, where the first IP address information includes a first IP address or a first IP address prefix, and the first IP address information is specifically obtained by the access controller based on the first access loop identifier; and forwarding, by the first network node, the first IP address information to the user-side device.

With reference to the second aspect, in a first possible implementation manner of the second aspect, the method further includes: sending, by the first network node, a Media Access Control (MAC) address of the user-side device to the access controller; receiving, by the first network node, a mapping relationship between the first IP address information and the MAC address, where the mapping relationship is sent by the access controller; and generating, by the first network node, a mapping relationship table between IP address information and a MAC address.

With reference to the second aspect or the first possible implementation manner of the second aspect, in a second possible implementation manner of the second aspect, the first message and the first access loop identifier are included in an OpenFlow message.

With reference to the second aspect or the first possible implementation manner of the second aspect or the second possible implementation manner of the second aspect, in a third possible implementation manner of the second aspect, the first network node is an access node (AN), and the user-side device is customer-premises equipment (CPE); or the first network node is an optical network unit (ONU), and the user-side device is CPE; or the first network node can be CPE, and the user-side device is user equipment (UE) connected to the CPE.

A third aspect of this application further provides an access controller, including a receiving unit, configured to receive a first message used to obtain Internet Protocol (IP) address information for a user-side device and a first access loop identifier of a first network node, where the first message and the first access loop identifier are sent by the first network node, the first access loop identifier is not carried in the first message, and the IP address information includes an IP address or an IP address prefix; a processing unit, configured to obtain first IP address information for the user-side device based on the first access loop identifier, where the first IP address information includes a first IP address or a first IP address prefix; and a sending unit, configured to send the first IP address information to the first network node.

With reference to the third aspect, in a first possible implementation manner of the third aspect, the processing unit is specifically configured to: control the sending unit to send either the first access loop identifier or the first access loop identifier and a second access loop identifier of a second network node to an authentication, authorization and accounting (AAA) server; control the receiving unit to receive authorization information sent by the AAA server; and obtain or allocate the first IP address information based on the authorization information, where the second network node and the first network node belong to a same data packet forwarding path, and the second access loop identifier is determined according to the first access loop identifier and a correspondence between the first access loop identifier and the second access loop identifier.

With reference to the third aspect, in a second possible implementation manner of the third aspect, the processing unit is specifically configured to: control the sending unit to send either the first access loop identifier or the first access loop identifier and a second access loop identifier of a second network node to an address allocation node, where the address allocation node includes an IP edge node, a Dynamic Host Configuration Protocol (DHCP) server, or an authentication, authorization and accounting (AAA) server; and control the receiving unit to receive the first IP address information sent by the address allocation node, where the second network node and the first network node belong to a same data packet forwarding path, and the second access loop identifier is determined according to the first access loop identifier and a correspondence between the first access loop identifier and the second access loop identifier.

With reference to the second possible implementation manner of the third aspect, in a third possible implementation manner of the third aspect, the processing unit is specifically configured to: add either the first access loop identifier or the first access loop identifier and the second access loop identifier to the first message, to form a second message; and control the sending unit to send the second message to the address allocation node; or the processing unit is specifically configured to create a second message, where the second message carries the first access loop identifier or carries the first access loop identifier and the second access loop identifier; and control the sending unit to send the second message to the address allocation node.

With reference to the third aspect or any one of the first possible implementation manner of the third aspect to the third possible implementation manner of the third aspect, in a fourth possible implementation manner of the third aspect, the receiving unit is further specifically configured to receive a Media Access Control (MAC) address of the user-side device that is sent by the first network node; the processing unit is further specifically configured to form a mapping relationship between the first IP address information and the MAC address according to the obtained first IP address information and the MAC address; and the sending unit is further specifically configured to send the mapping relationship to the first network node.

With reference to the third aspect or any one of the first possible implementation manner of the third aspect to the fourth possible implementation manner of the third aspect, in a fifth possible implementation manner of the third aspect, the first message and the first access loop identifier are included in an OpenFlow message.

With reference to the third aspect or any one of the first possible implementation manner of the third aspect to the fifth possible implementation manner of the third aspect, in a sixth possible implementation manner of the third aspect, the first network node is an access node (AN), and the user-side device is customer-premises equipment (CPE); or the first network node is an optical network unit (ONU), and the user-side device is CPE; or the first network node is CPE, and the user-side device is user equipment (UE) connected to the CPE.

A fourth aspect of this application further provides an access controller, including a receiver, configured to receive a first message used to obtain Internet Protocol (IP) address information for a user-side device and a first access loop identifier of a first network node, where the first message and the first access loop identifier are sent by the first network node, the first access loop identifier is not carried in the first message, and the IP address information includes an IP address or an IP address prefix; a processor, configured to obtain first IP address information for the user-side device based on the first access loop identifier, where the first IP address information includes a first IP address or a first IP address prefix; and a transmitter, configured to send the first IP address information to the first network node.

With reference to the fourth aspect, in a first possible implementation manner of the fourth aspect, the processor is specifically configured to: send either the first access loop identifier or the first access loop identifier and a second access loop identifier of a second network node to an authentication, authorization and accounting (AAA) server; receive authorization information sent by the AAA server; and obtain or allocate the first IP address information based on the authorization information, where the second network node and the first network node belong to a same data packet forwarding path, and the second access loop identifier is determined according to the first access loop identifier and a correspondence between the first access loop identifier and the second access loop identifier; and receive the first IP address information sent by an address allocation node.

With reference to the fourth aspect, in a second possible implementation manner of the fourth aspect, the processor is specifically configured to: send either the first access loop identifier or the first access loop identifier and a second access loop identifier of a second network node to an address allocation node, where the address allocation node includes an IP edge node, a Dynamic Host Configuration Protocol (DHCP) server, or an authentication, authorization and accounting (AAA) server, the second network node and the first network node belong to a same data packet forwarding path, and the second access loop identifier is determined according to the first access loop identifier and a correspondence between the first access loop identifier and the second access loop identifier; and receive the first IP address information sent by the address allocation node.

With reference to the second possible implementation manner of the fourth aspect, in a third possible implementation manner of the fourth aspect, the processor is specifically configured to: add either the first access loop identifier or the first access loop identifier and the second access loop identifier to the first message, to form a second message; and send the second message to the address allocation node; or the processor is specifically configured to: create a second message, where the second message carries the first access loop identifier or carries the first access loop identifier and the second access loop identifier; and send the second message to the address allocation node.

With reference to the fourth aspect or any one of the first possible implementation manner of the fourth aspect to the third possible implementation manner of the fourth aspect, in a fourth possible implementation manner of the fourth aspect, the receiver is further specifically configured to receive a Media Access Control (MAC) address of the user-side device that is sent by the first network node; the processor is further specifically configured to form a mapping relationship between the first IP address information and the MAC address according to the obtained first IP address information and the MAC address; and the transmitter is further specifically configured to send the mapping relationship to the first network node.

With reference to the fourth aspect or any one of the first possible implementation manner of the fourth aspect to the fourth possible implementation manner of the fourth aspect, in a fifth possible implementation manner of the fourth aspect, the first message and the first access loop identifier are included in an OpenFlow message.

With reference to the fourth aspect or any one of the first possible implementation manner of the fourth aspect to the fifth possible implementation manner of the fourth aspect, in a sixth possible implementation manner of the fourth aspect, the first network node is an access node (AN), and the user-side device is customer-premises equipment (CPE); or the first network node is an optical network unit ONU, and the user-side device is CPE; or the first network node is CPE, and the user-side device is user equipment (UE) connected to the CPE.

A fifth aspect of this application provides a network node, including a first receiving unit, configured to receive a first message that is used to obtain Internet Protocol (IP) address information for a user-side device and is sent by the user-side device, where the IP address information includes an IP address or an IP address prefix; a first sending unit, configured to send the first message and a first access loop identifier of the network node to an access controller, where the first access loop identifier is not carried in the first message; a second receiving unit, configured to receive first IP address information obtained for the user-side device, where the first IP address information includes a first IP address or a first IP address prefix, and the first IP address information is specifically obtained by the access controller based on the first access loop identifier; and a second sending unit, configured to forward the first IP address information to the user-side device.

With reference to the fifth aspect, in a first possible implementation manner of the fifth aspect, the network node further includes a processing unit, where the first sending unit is further specifically configured to send a Media Access Control (MAC) address of the user-side device to the access controller; the second receiving unit is further specifically configured to receive a mapping relationship between the first IP address information and the MAC address, where the mapping relationship is sent by the access controller; and the processing unit is specifically configured to generate a mapping relationship table between IP address information and a MAC address.

With reference to the fifth aspect or the first possible implementation manner of the fifth aspect, in a second possible implementation manner of the fifth aspect, the first message and the first access loop identifier are included in an OpenFlow message.

With reference to the fifth aspect or the first possible implementation manner of the fifth aspect or the second possible implementation manner of the fifth aspect, in a third possible implementation manner of the fifth aspect, the network node is an access node (AN), and the user-side device is customer-premises equipment (CPE); or the network node is an optical network unit (ONU), and the user-side device is customer-premises equipment (CPE); or the network node is customer-premises equipment (CPE), and the user-side device is user equipment (UE) connected to the CPE.

A sixth aspect of this application provides a network node, including a first receiver, configured to receive a first message that is used to obtain Internet Protocol (IP) address information for a user-side device and is sent by the user-side device, where the IP address information includes an IP address or an IP address prefix; a first transmitter, configured to send the first message and a first access loop identifier of the network node to an access controller, where the first access loop identifier is not carried in the first message; a second receiver, configured to receive first IP address information that is obtained for the user-side device and is sent by the access controller, where the first IP address information includes a first IP address or a first IP address prefix, and the first IP address information is specifically obtained by the access controller based on the first access loop identifier; and a second transmitter, configured to forward the first IP address information to the user-side device.

With reference to the sixth aspect, in a first possible implementation manner of the sixth aspect, the network node further includes a processor, where the first transmitter is further specifically configured to send a Media Access Control (MAC) address of the user-side device to the access controller; the second receiver is further specifically configured to receive a mapping relationship between the first IP address information and the MAC address, where the mapping relationship is sent by the access controller; and the processor is specifically configured to generate a mapping relationship table between IP address information and a MAC address.

With reference to the sixth aspect or the first possible implementation manner of the sixth aspect, in a second possible implementation manner of the sixth aspect, the first message and the first access loop identifier are included in an OpenFlow message.

With reference to the sixth aspect or the first possible implementation manner of the sixth aspect or the second possible implementation manner of the sixth aspect, in a third possible implementation manner of the sixth aspect, the network node is an access node (AN), and the user-side device is customer-premises equipment (CPE); or the network node is an optical network unit (ONU), and the user-side device is CPE; or the network node is CPE, and the user-side device is user equipment (UE) connected to the CPE.

A seventh aspect of this application provides a message processing method, including receiving, by an access controller, a first message used to obtain Internet Protocol (IP) address information for a user-side device and a first access loop identifier of a first network node, where the first message and the first access loop identifier are sent by the first network node, the first access loop identifier is not carried in the first message; obtaining, by the access controller, an authentication, authorization and accounting (AAA) message according to the first access loop identifier, where the AAA message includes the first access loop identifier; and sending, by the access controller, the AAA message to an AAA server.

Optionally, where the method further includes receiving, by the access controller, authentication or authorization information sent by the AAA server; obtaining or allocating, by the access controller, IP address information based on the authentication or authorization information, where the IP address information includes an IP address or an IP address prefix; and sending, by the access controller, the IP address information to the first network node.

Optionally, where the AAA message further includes a second access loop identifier of a second network node, the second network node and the first network node belong to a same data packet forwarding path; the obtaining, by the access controller, an AAA message according to the first access loop identifier includes: obtaining, by the access controller, the second access loop identifier according to the first access loop identifier and a correspondence between the first access loop identifier and the second access loop identifier; and generating, by the access controller, the AAA message according to the first access loop identifier and the second access loop identifier.

Optionally, where the method further includes receiving, by the access controller, a Media Access Control (MAC) address of the user-side device that is sent by the first network node; forming, by the access controller, a mapping relationship between the IP address information and the MAC address according to the obtained IP address information and the MAC address; and sending, by the access controller, the mapping relationship to the first network node.

Optionally, where the first message and the first access loop identifier are included in an OpenFlow message.

A eighth aspect of this application provides a message processing method, including receiving, by a first network node, a first message that is used to obtain Internet Protocol (IP) address information for a user-side device and is sent by the user-side device; sending, by the first network node, the first message and a first access loop identifier of the first network node to an access controller, where the first access loop identifier is not carried in the first message.

Optionally, where the method further includes receiving, by the first network node, IP address information that is obtained for the user-side device and is sent by the access controller, where the IP address information includes an IP address or an IP address prefix, and the IP address information is obtained by the access controller based on the first access loop identifier; and sending, by the first network node, the IP address information to the user-side device.

Optionally, where the method further includes sending, by the first network node, a Media Access Control (MAC) address of the user-side device to the access controller; receiving, by the first network node, a mapping relationship between the IP address information and the MAC address, where the mapping relationship is sent by the access controller; and generating, by the first network node, a mapping relationship table between the IP address information and the MAC address.

Optionally, where the first message and the first access loop identifier are included in an OpenFlow message.

A ninth aspect of this application provides an access controller, including a receiving unit, configured to receive a first message used to obtain Internet Protocol (IP) address information for a user-side device and a first access loop identifier of a first network node, where the first message and the first access loop identifier are sent by the first network node, the first access loop identifier is not carried in the first message; a processing unit, configured to obtain an AAA message according to the first access loop identifier, where the AAA message includes the first access loop identifier; and a sending unit, configured to send the AAA message to an AAA server.

Optionally, where the receiving unit is further configured to receive authentication or authorization information sent by the AAA server; the processing unit is further configured to obtain or allocate IP address information based on the authentication or authorization information, where the IP address information includes an IP address or an IP address prefix; and the sending unit is further configured to send the IP address information to the first network node.

Optionally, where the AAA message further includes a second access loop identifier of a second network node, the second network node and the first network node belong to a same data packet forwarding path; the processing unit is specifically configured to: obtain the second access loop identifier according to the first access loop identifier and a correspondence between the first access loop identifier and the second access loop identifier; and generate the AAA message according to the first access loop identifier and the second access loop identifier.

Optionally, where the receiving unit is further configured to receive a Media Access Control (MAC) address of the user-side device that is sent by the first network node; the processing unit is further configured to form a mapping relationship between the IP address information and the MAC address according to the obtained IP address information and the MAC address; and the sending unit is further configured to send the mapping relationship to the first network node.

A tenth aspect of this application provides a network node, including a first receiving unit, configured to receive a first message that is used to obtain Internet Protocol (IP) address information for a user-side device and is sent by the user-side device; a first sending unit, configured to send the first message and a first access loop identifier of the network node to an access controller, where the first access loop identifier is not carried in the first message.

Optionally, where the network node further includes a second receiving unit, configured to receive the IP address information obtained for the user-side device, where the IP address information includes an IP address or an IP address prefix, and the IP address information is obtained by the access controller based on the first access loop identifier; and a second sending unit, configured to send the IP address information to the user-side device.

Optionally, where the network node further includes a processing unit, where the first sending unit is further configured to send a Media Access Control (MAC) address of the user-side device to the access controller; the second receiving unit is further configured to receive a mapping relationship between the IP address information and the MAC address, where the mapping relationship is sent by the access controller; and the processing unit is configured to generate a mapping relationship table between the IP address information and the MAC address.

The one or more technical solutions provided in the embodiments of this application have at least the following technical effects or advantages:

In the embodiments of this application, a control function of a network node is transferred to an access controller. The access controller receives a first message used to obtain Internet Protocol (IP) address information for a user-side device and a first access loop identifier of a first network node, where the first message and the first access loop identifier are sent by the first network node. The access controller obtains first IP address information for the user-side device based on the first access loop identifier. Then, the access controller sends the first access loop identifier and the first IP address information to the first network node, so that the first network node can forward the first IP address information to the user-side device. Therefore, in the embodiments of this application, the first access loop identifier is processed by the access controller, and the first network node performs only a simple forwarding action, and no longer needs to support a function of processing various messages. In this application, because a control plane function of the network node is separated out, the network node is simplified to a simple forwarding device, and no longer needs to support a function of processing various control messages (such as DHCP/router solicitation (RS)/router advertisement (RA)) related to an IP address or an IP address prefix. Accordingly, the network node can be decoupled from a service, and reducing operation and maintenance complexity and management costs can be reduced. Further, the network node is more simplified, which helps implement high performance of the network node and reuse the network node.

BRIEF DESCRIPTION OF DRAWINGS

To describe the technical solutions in the present disclosure more clearly, the following briefly describes the accompanying drawings required for describing the implementation manners. Apparently, the accompanying drawings in the following description show merely some implementation manners of the present disclosure, and a person of ordinary skill in the art may still derive other drawings from these accompanying drawings without creative efforts.

DETAILED DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

In the embodiments of this application, a control function of a network node can be transferred to an access controller. The access controller receives a first message used to obtain Internet Protocol (IP) address information for a user-side device and a first access loop identifier of a first network node, where the first message and the first access loop identifier are sent by the first network node. The access controller obtains first IP address information for the user-side device based on the first access loop identifier. Then, the access controller sends the first access loop identifier and the first IP address information to the first network node, so that the first network node can forward the first IP address information to the user-side device. Therefore, in the embodiments of this application, the first access loop identifier can be processed by the access controller, and the first network node performs only a simple forwarding action, and no longer needs to support a function of processing various messages. In this embodiment, because a control plane function of the network node can be separated out, the network node can be simplified to a simple forwarding device, and no longer needs to support a function of processing various control messages (such as DHCP/RS/RA) related to an IP address or an IP address prefix. Accordingly, the network node can be decoupled from a service, and operation and maintenance complexity and management costs can be reduced. Further, the network node can be more simplified, which helps implement high performance of the network node and reuse the network node.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the following, implementation manners of this application are described in detail with reference to the accompanying drawings.

Embodiment 1

Figure 1:
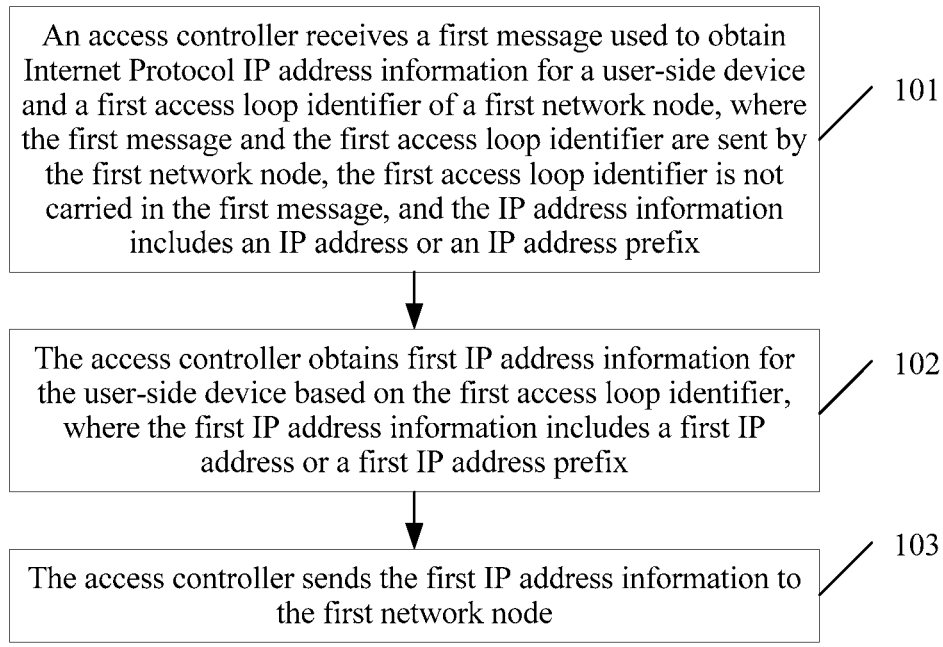
FIG. 1 is a flowchart of a message processing method on an access controller side according to an embodiment of this application.

This embodiment provides a message processing method. Referring to FIG. 1, FIG. 1 is a flowchart of the message processing method in this embodiment. The method includes the following contents.

At step 101, an access controller receives a first message used to obtain internet protocol (IP) address information for a user-side device and a first access loop identifier of a first network node, where the first message and the first access loop identifier are sent by the first network node, the first access loop identifier is not carried in the first message, and the IP address information includes an IP address or an IP address prefix.

At step 102, the access controller obtains first IP address information for the user-side device based on the first access loop identifier, where the first IP address information includes a first IP address or a first IP address prefix.

At step 103, the access controller sends the first IP address information to the first network node, so that the first network node can forward the first IP address information to the user-side device.

Figure 2:
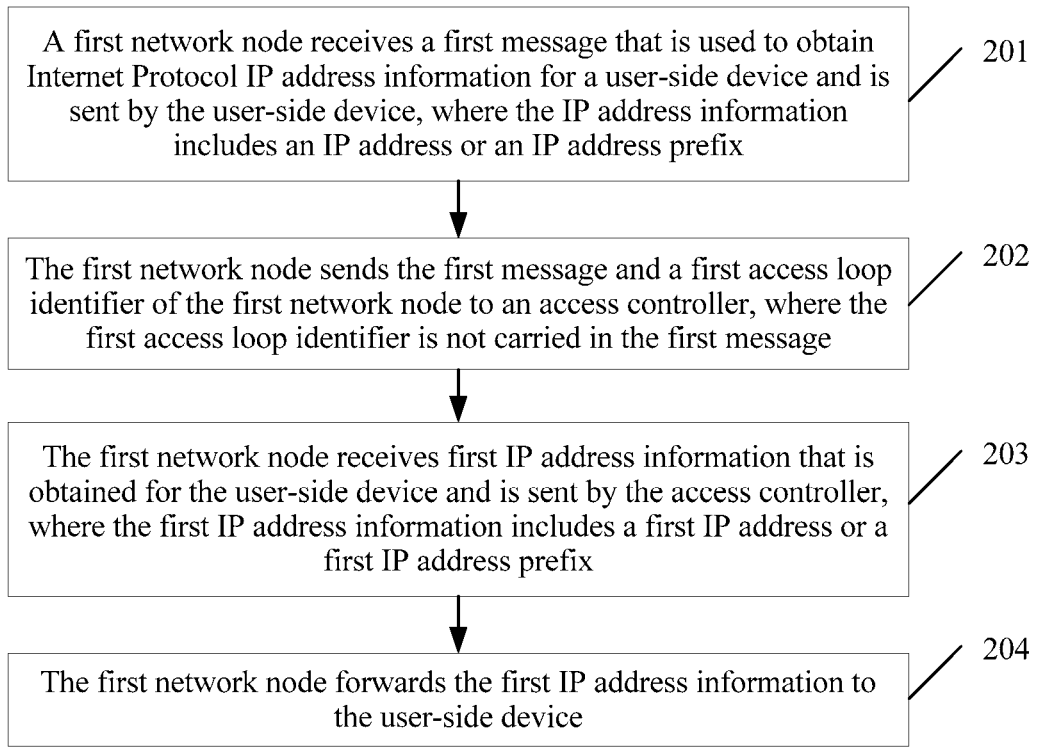
FIG. 2 is a schematic flowchart of a message processing method on a network node side according to an embodiment of this application.

The method flow shown in FIG. 1 is described from an access controller side. Further referring to FIG. 2, FIG. 2 is a method flowchart of a message processing method on a network node side in this embodiment. As shown in FIG. 2, the method includes the following contents.

At step 201, a first network node receives a first message that can be used to obtain Internet Protocol (IP) address information for a user-side device and can be sent by the user-side device, where the IP address information includes an IP address or an IP address prefix.

At step 202, the first network node sends the first message and a first access loop identifier of the first network node to an access controller, where the first access loop identifier may not be carried in the first message.

At step 203, the first network node receives first IP address information that can be obtained for the user-side device and can be sent by the access controller, where the first IP address information includes a first IP address or a first IP address prefix. The first IP address information can be specifically obtained by the access controller based on the first access loop identifier.

At step 204, the first network node forwards the first IP address information to the user-side device.

Figure 3:
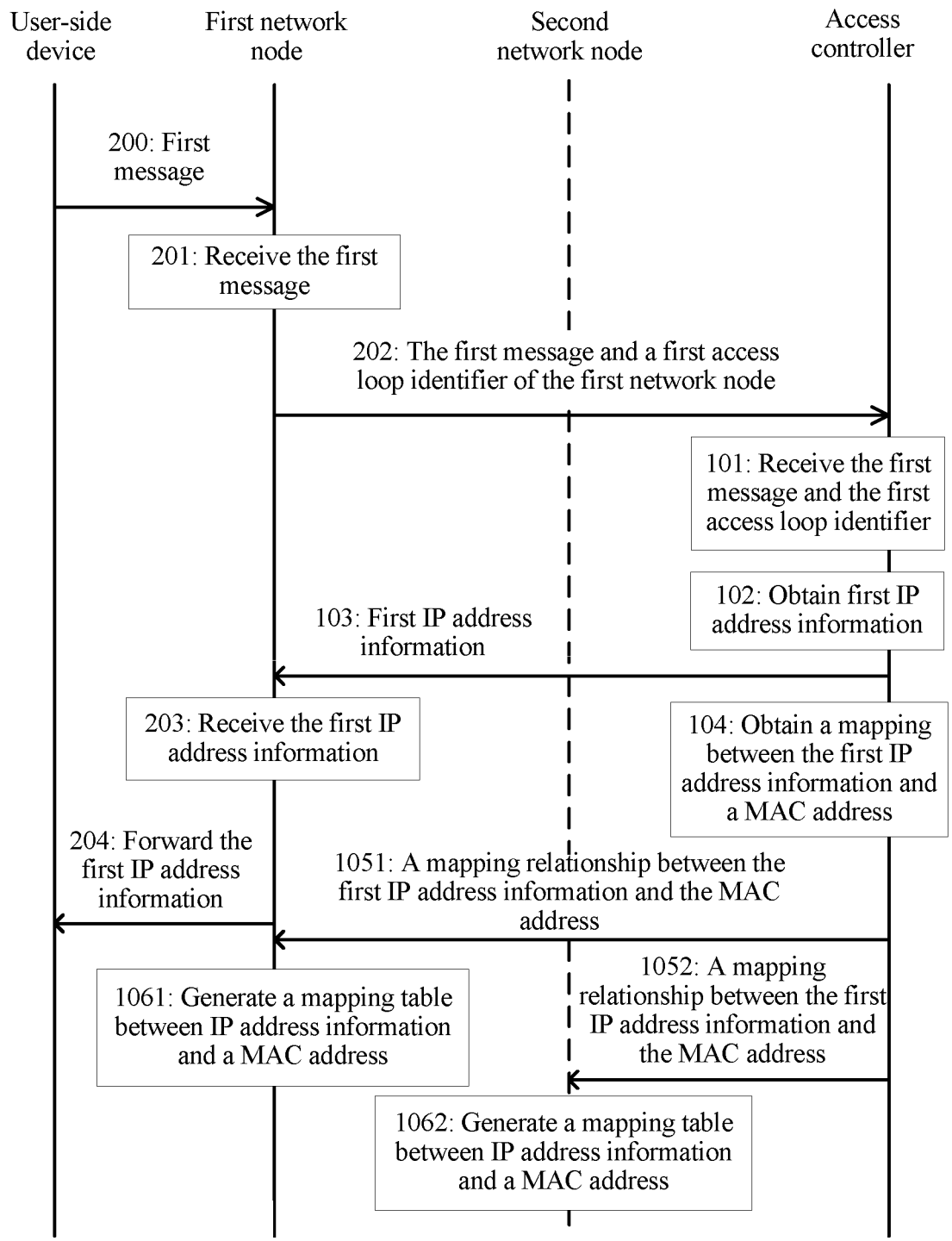
FIG. 3 is a diagram of an interaction process among network elements in a message processing method according to an embodiment of this application.

Referring to FIG. 3, FIG. 3 is a diagram of an interaction process among a user-side device, a network node, and an access controller. An implementation process of the message processing method in this embodiment of this application is described in detail in the following with reference to FIG. 1, FIG. 2, and FIG. 3.

At step 200, the user-side device sends a first message to a first network node, and correspondingly, the first network node performs step 201 of receiving the first message. After receiving the first message, the first network node performs step 202 of sending the first message and a first access loop identifier of the first network node to the access controller, and correspondingly, the access controller performs step 101 of receiving the first message and the first access loop identifier. After receiving the first message and the first access loop identifier, the access controller performs step 102 of obtaining first IP address information for a user-side device based on the first access loop identifier. Then, the access controller performs step 103 of sending the first IP address information to the first network node, and correspondingly, the first network node performs step 203 of receiving the first IP address information. Then, the first network node performs step 204 of forwarding the first IP address information to the user-side device.

In view of this, in this embodiment of this application, for a message sent by a user-side device, a first network node sends the message and an access loop identifier to an access controller for processing, then receives first IP address information from the access controller, and forwards the first IP address information to the user-side device, which implements separation between a control plane function and a forwarding plane function during message processing. Operation and maintenance complexity of a network node can be reduced, and management costs can also be reduced.

The access loop identifier can be also referred to as an access line identifier, and can uniquely identify a network node and a physical port or a logical port on the first network node that receives the first message.

The first message specifically includes a device identifier of the user-side device.

Optionally, in step 103, the access controller further delivers the first access loop identifier to the first network node, and correspondingly, and in step 203, the first network node further receives the first access loop identifier sent by the access controller. Therefore, further, in step 204, the first network node specifically forwards the first IP address information to the user-side device by using a physical port corresponding to the first access loop identifier.

In some implementations, in step 204, the first network node may specifically forward the first IP address information to the user-side device by using a forwarding table.

Optionally, that the first network node sends the first message and a first access loop identifier to the access controller in step 202 specifically includes: creating a third message of a type different from that of the first message, where the third message carries the first message and the first access loop identifier; and sending the third message to the access controller. The type of the third message can be specifically related to a communications protocol between the network node and the access controller. For example, the network node may be connected to the access controller by using OpenFlow, an access management or control protocol (such as an optical network unit management and control interface OMCI or Ethernet operation, administration, and maintenance ETH OAM), or a tunnel. Therefore, the type of the third message may be, for example, an OpenFlow message. Correspondingly, when the access controller performs step 103, step 103 specifically includes: creating a fourth message of a same type as the third message, where the fourth message carries and sends the first access loop identifier and the first IP address information to the first network node. For example, the fourth message can be also an OpenFlow message.

Specific implementation manners of step 102 are described in detail in the following, and step 102 includes but is not limited to the following two specific implementation manners.

In a first possible implementation manner, step 102 includes: sending, by the access controller, either the first access loop identifier or the first access loop identifier and a second access loop identifier of a second network node to an AAA (authentication, authorization and accounting) server; receiving, by the access controller, authorization information sent by the AAA server; and obtaining or allocating, by the access controller, the first IP address information based on the authorization information. The AAA server specifically performs authorization verification based on the first access loop identifier or based on the first access loop identifier and the second access loop identifier, and delivers the authorization information after the verification succeeds. Specifically, when the access controller sends the first access loop identifier, the AAA server performs authorization verification based on the first access loop identifier; when the access controller sends the first access loop identifier and the second access loop identifier, the AAA server performs authorization verification based on the first access loop identifier and the second access loop identifier.

Optionally, when sending the authorization information, the AAA server may further send service information to the access controller.

First, the second network node and the first network node belong to a same data packet forwarding path, and the second access loop identifier can be determined according to the first access loop identifier and a correspondence between the first access loop identifier and the second access loop identifier. For example, the second access loop identifier can be determined by the access controller according to the correspondence. A quantity of network node levels can be related to a specific network. For example, for a passive optical network (PON), there are generally two network nodes, where, for example, a first network node can be an optical network unit (ONU), and a second network node can be an optical line terminal (OLT).

Then, the sending, by the access controller, either the first access loop identifier or the first access loop identifier and a second access loop identifier of a second network node to an AAA server specifically includes: initiating, by the access controller, a fifth message of a type different from that of the first message, where the fifth message carries the first access loop identifier or carries the first access loop identifier and the second access loop identifier; and sending the fifth message to the AAA server. Correspondingly, the receiving, by the access controller, authorization information sent by the AAA server specifically includes: receiving a sixth message sent by the AAA server, where the sixth message carries the authorization information, and the sixth message and the fifth message are of a same type. For example, each can be an AAA message.

In this embodiment, the access controller can be integrated with a function of allocating the first IP address information by a Dynamic Host Configuration Protocol (DHCP) server. Therefore, the AAA server can first perform authentication or authorization on the user-side device, and after the authentication succeeds or being authorized by the AAA server, the access controller allocates an IP address or an IP address prefix.

In another embodiment, after being authorized by the AAA server, the access controller may not allocate the first IP address information, but request an IP address or an IP address prefix from the DHCP server, and by receiving first IP address information sent by the DHCP server, obtain an IP address or an IP address prefix corresponding to the user-side device.

In a second possible implementation manner, step 102 includes: sending, by the access controller, either the first access loop identifier or the first access loop identifier and a second access loop identifier of a second network node to an address allocation node. In this embodiment, the address allocation node includes an IP edge node, a DHCP server, or an AAA server, so that the address allocation node allocates the first IP address information. The step 102 further includes receiving, by the access controller, the first IP address information, such as an IP address or an IP address prefix, sent by the address allocation node.

Optionally, in an embodiment, the sending, by the access controller, either the first access loop identifier or the first access loop identifier and a second access loop identifier of a second network node to an address allocation node includes: adding, by the access controller, either the first access loop identifier or the first access loop identifier and the second access loop identifier to the first message, to form a second message; and sending, by the access controller, the second message to the address allocation node. In other words, the second message and the first message are of a same type.

Optionally, in another embodiment, the sending, by the access controller, either the first access loop identifier or the first access loop identifier and a second access loop identifier of a second network node to an address allocation node includes: creating, by the access controller, a second message, where the second message carries the first access loop identifier or carries the first access loop identifier and the second access loop identifier; and sending, by the access controller, the second message to the address allocation node. In an embodiment, the first message and the second message are messages of different types. For example, the first message can be an RS message, and the second message can be an AAA message. In another embodiment, the first message and the second message are messages of a same type. For example, each of the first message and the second message can be a DHCP message. In this case, the second message may further carry the first message.

Further, in the second possible implementation manner, if the access controller sends the first access loop identifier and the second access loop identifier to the address allocation node, it indicates that there are at least two network nodes, and before the sending, the access controller further obtains the second access loop identifier of the second network node. Therefore, in this embodiment, before the first access loop identifier and the second access loop identifier are sent, the method further includes: searching for the second access loop identifier according to the first access loop identifier. Generally, during network construction, a correspondence between the first access loop identifier and the second access loop identifier can be already stored on the access controller. Therefore, the access controller can obtain the second access loop identifier by searching the stored correspondence according to the first access loop identifier.

Referring to FIG. 3 again, in a further embodiment, the method further includes: receiving, by the access controller, a Media Access Control (MAC) address of the user-side device that can be sent by the first network node. Specifically, a first DHCP message sent by the user-side device to a network node can be carried on an Ethernet frame, and a source MAC address in a frame header of the Ethernet frame can be the MAC address of the user-side device. After receiving the first DHCP message, the network node extracts the source MAC address from the frame header of the Ethernet frame in which the first DHCP message can be located. Then, the first network node sends the MAC address to the access controller. In step 104: the access controller forms a mapping relationship between the first IP address information and the MAC address according to the obtained first IP address information and the MAC address. In step 1051 or step 1052, the access controller sends the mapping relationship between the first IP address information and the MAC address to the first network node or the second network node, so that the first network node or the second network node generates a mapping relationship table between IP address information and a MAC address. The MAC address of the user-side device may be a MAC address of customer-premises equipment (CPE), or may be a MAC address of user equipment (UE).

Correspondingly, on a network node side, the method further includes: sending, by the first network node, the MAC address of the user-side device to the access controller; and receiving, by the first network node, the mapping relationship between the first IP address information and the MAC address, where the mapping relationship can be sent by the access controller; and in step 1061, generating, by the first network node, the mapping relationship table between IP address information and a MAC address.

Alternatively, the method includes: sending, by the first network node, the MAC address of the user-side device to the access controller; and receiving, by the second network node, the mapping relationship between the first IP address information and the MAC address; and in step 1062, generating, by the second network node, the mapping relationship table between IP address information and a MAC address.

That the first network node sends the MAC address to the access controller may be performed when the first message can be being sent to the access controller in step 202, or the MAC address may be sent before or after step 202, as long as the access controller receives the MAC address before step 104. Step 104 may be specifically performed after step 102 or performed after step 103.

Generally, when there can be only one network node, the mapping relationship between the first IP address information and the MAC address can be sent to the first network node, and the mapping relationship table can be saved on the first network node. When there are two network nodes, the mapping relationship between the first IP address information and the MAC address can be sent to the second network node, and the mapping relationship can be saved on the second network node.

In this embodiment, the access controller obtains the mapping relationship between the first IP address information and the MAC address, and delivers the mapping relationship to a network node. The network node saves the mapping relationship, to implement a function of preventing IP address spoofing or IP address prefix spoofing (IP prefix spoofing).

Optionally, the first network node can be an access node (AN), and the user-side device can be CPE; or the first network node can be an optical network unit (ONU), and the user-side device can be CPE; or the first network node can be CPE, and the user-side device can be user equipment (UE) connected to the CPE.

Several specific examples are separately described in detail in the following. First, in a first embodiment, there can be only one level of network node, and the network node can be a network node in a DSL/Ethernet. When the network node supports a DSL line of an asynchronous transfer mode (ATM), a format of the first access loop identifier can be Access-Node-Identifier atm slot/port:vpi.vci. When the network node supports an Ethernet DSL/Ethernet line, a format of the first access loop identifier can be Access-Node-Identifier eth slot/port [:vlan-id]. Access-Node-Identifier can be an identifier of the network node (such as a DSLAM); slot/port can be one or a combination of a chassis (chassis) number, a rack (rack) number, a frame (frame) number, a slot (slot) number, a sub-slot (sub-slot) number, or a port (port) number on the network node; vpi.vci can be a virtual path identifier and a virtual channel identifier on the DSL line; "[ ]" in the format means optional, and:vlan-id (virtual local area network identifier, virtual local area network identifier).

Figure 4:
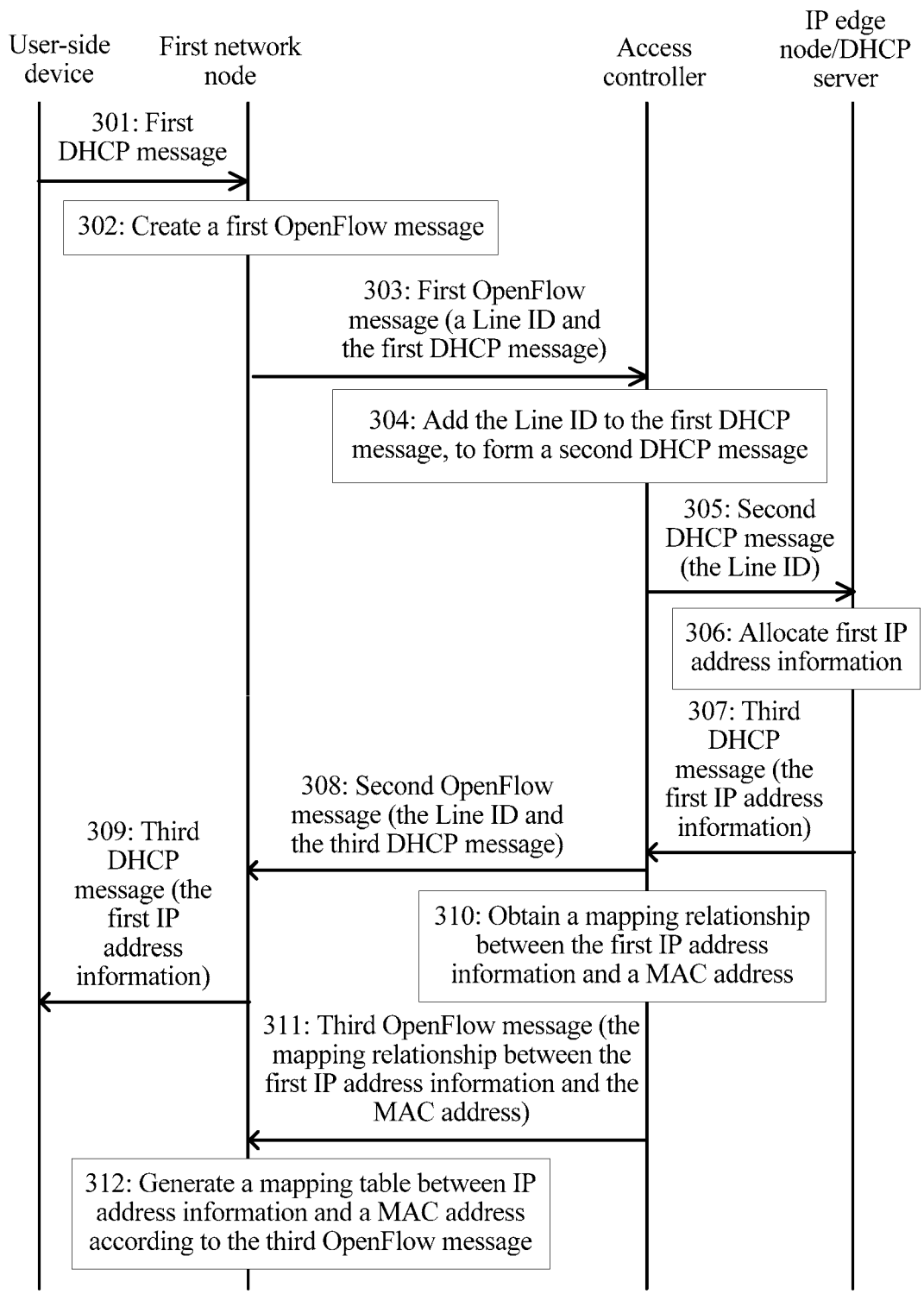
FIG. 4 is a schematic diagram of an implementation form of a message processing method according to an embodiment of the present disclosure.

A message processing method in FIG. 4 can be a scenario in which a user-side device requests to allocate first IP address information, and the method includes:

At step 301, a user-side device sends a first DHCP message to a first network node.

At step 302, the first network node creates a first OpenFlow message. OpenFlow extension can be required, so that the first OpenFlow message (such as a packet-in message) carries the first DHCP message and a corresponding first access loop identifier Line ID of the first network node. Optionally, the first OpenFlow message further carries a MAC address of the user-side device that sends the first DHCP message.

At step 303, the first network node sends the first OpenFlow message to an access controller.

At step 304, the access controller obtains the first DHCP message and the first access loop identifier Line ID from the first OpenFlow message, and adds the Line ID to the first DHCP message, to form a second DHCP message, or the access controller obtains the first DHCP message and the first access loop identifier Line ID from the first OpenFlow message, and creates a second DHCP message, where the second DHCP message carries the first DHCP message and the first access loop identifier Line ID.

At step 305, the access controller sends the second DHCP message to an IP edge node (such as a BNG/BRAS) or a DHCP server. The BRAS can be a broadband access server.

At step 306, the IP edge node/DHCP server obtains or allocates first IP address information according to the Line ID.

At step 307, the IP edge node/DHCP server sends a third DHCP message to the access controller, where the third DHCP message carries the allocated first IP address information.

At step 308, the access controller sends a second OpenFlow message to the first network node, where the second OpenFlow message carries the Line ID and the third DHCP message.

At step 309, the first network node forwards the third DHCP message to the user-side device.

Further, the method can include:

The first network node further sends the MAC address of the user-side device to the access controller, which is, for example, performed in step 302 or performed separately.

At step 310, the access controller forms a mapping relationship between the first IP address information and the MAC address according to the obtained first IP address information and the MAC address.

At step 311, the access controller sends a third OpenFlow message to the first network node, where the third OpenFlow message carries the mapping relationship between the first IP address information and the MAC address.

At step 312, the first network node generates a mapping relationship table between IP address information and a MAC address according to the third OpenFlow message.

Figure 5:
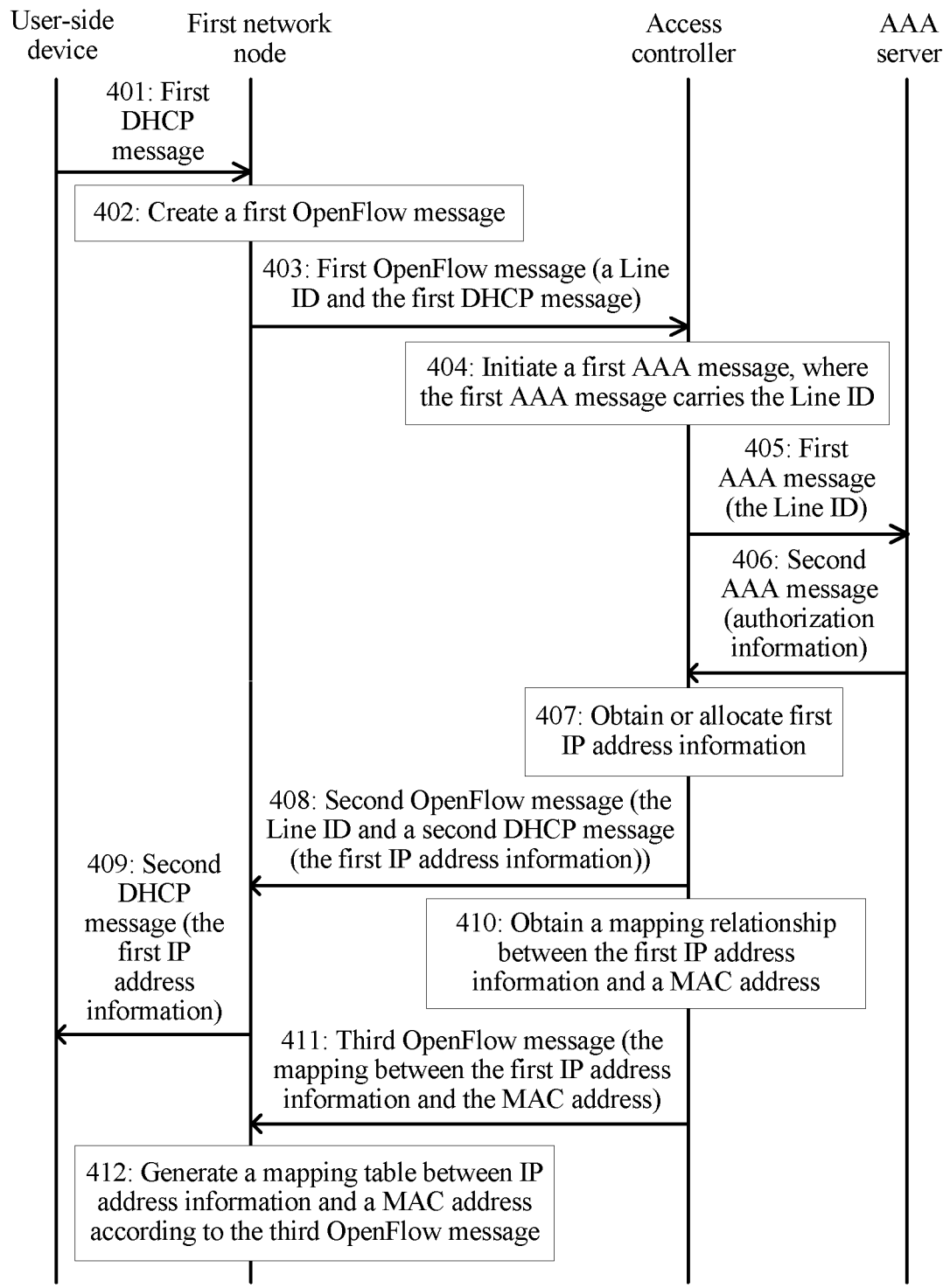
FIG. 5 is a schematic diagram of an implementation form of a message processing method according to an embodiment of the present disclosure.

Then, further referring to FIG. 5, FIG. 5 can be a flowchart of another message processing method according to an embodiment of the present disclosure. The method includes:

At step 401, a user-side device sends a first DHCP message to a first network node.

At step 402, the first network node creates a first OpenFlow message. OpenFlow extension can be required, so that the first OpenFlow message (such as a packet-in message) carries the first DHCP message and a corresponding first access loop identifier Line ID of the first network node. Optionally, the first OpenFlow message further carries a MAC address of the user-side device that sends the first DHCP message.

At step 403, the first network node sends the first OpenFlow message to an access controller.

At step 404, the access controller initiates a first AAA message, where the first AAA message carries the Line ID.

At step 405, the access controller sends the first AAA message to an AAA server.

At step 406, the AAA server sends a second AAA message to the access controller, where the second AAA message carries authorization information. Optionally, the second AAA message may further carry service information.

At step 407, the access controller obtains or allocates first IP address information based on the authorization information.

At step 408, the access controller sends a second OpenFlow message to the first network node, where the second OpenFlow message carries the Line ID and a second DHCP message, and the second DHCP message carries the allocated first IP address information.

At step 409, the first network node forwards the second DHCP message to the user-side device.

Further, the method can include: further sending, by the first network node, the MAC address to the access controller, which is, for example, performed in step 402 or performed separately; and step 410 to step 412, where step 410 to step 412 are the same as step 310 to step 312 in FIG. 4, and details are not described herein.

Figure 6:
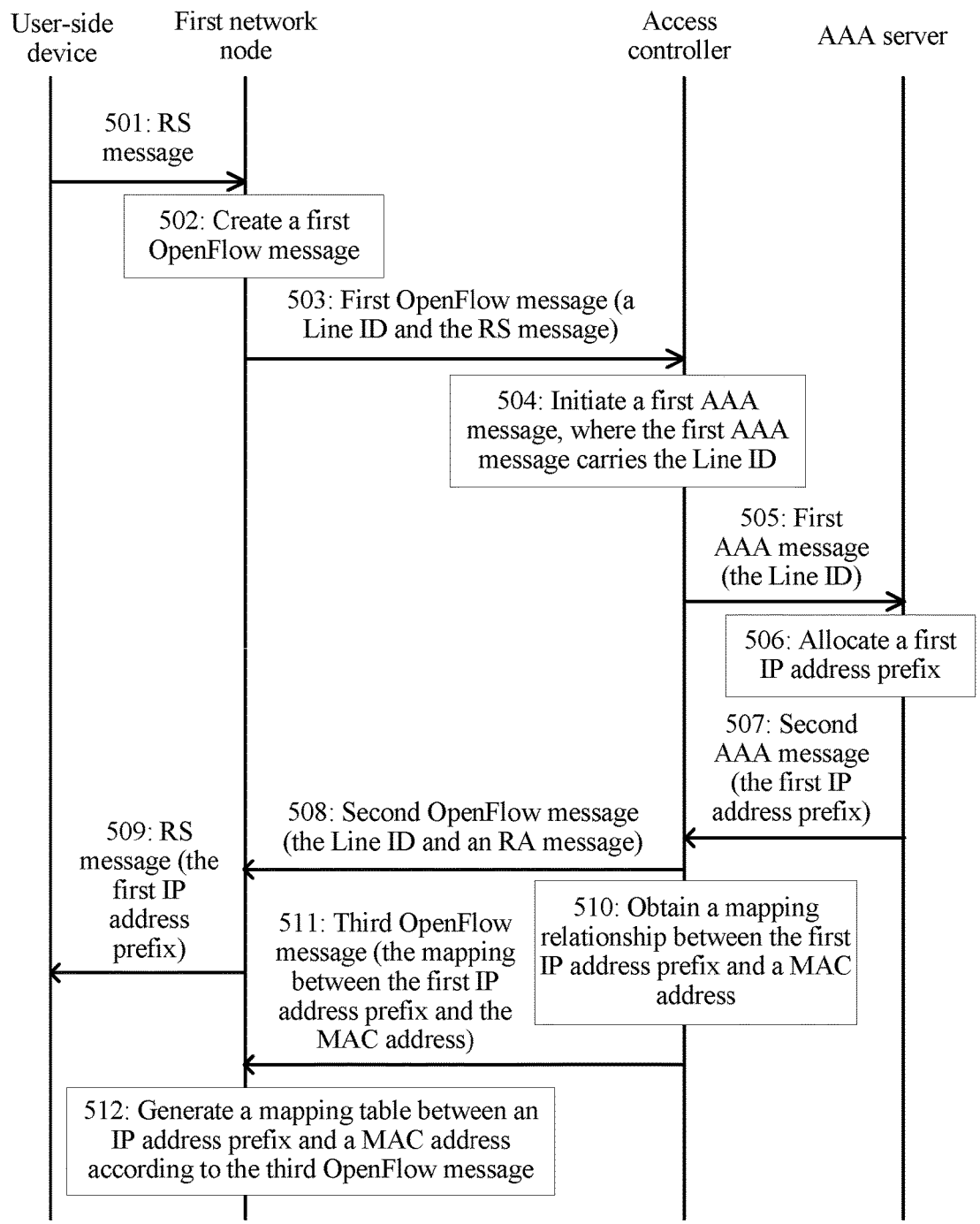
FIG. 6 is a schematic diagram of an implementation form of a message processing method according to an embodiment of the present disclosure.

Then, further referring to FIG. 6, FIG. 6 is an application scenario in an IPv6 (Internet Protocol Version 6) network according to an embodiment of the present disclosure. The message processing method includes:

At step 501, a user-side device sends a router solicitation (RS) message to a first network node.

At step 502, the first network node creates a first OpenFlow message. OpenFlow extension can be required, so that the first OpenFlow message (such as a packet-in message) carries the RS message and a corresponding first access loop identifier Line ID of the first network node. Optionally, the first OpenFlow message further carries a MAC address of the user-side device that sends the RS message.

At step 503, the first network node sends the first OpenFlow message to an access controller.

At step 504, the access controller obtains the first DHCP message and the first access loop identifier Line ID from the first OpenFlow message, and the access controller initiates a first AAA message, where the first AAA message carries the Line ID.

At step 505, the access controller sends the first AAA message to an AAA (authentication, authorization and accounting) server.

At step 506, the AAA server allocates a first IP address prefix according to the Line ID.

At step 507, the AAA server sends a second AAA message to the access controller, where the second AAA message carries the allocated first IP address prefix.

At step 508, the access controller sends a second OpenFlow message to the first network node. OpenFlow extension can be required, so that the second OpenFlow message carries the Line ID and a router advertisement (RA) message, and the RA message carries the allocated first IP address prefix.

At step 509, the first network node forwards the RA message to the user-side device.

Further, the method can include:

The first network node further sends the MAC address of the user-side device to the access controller, which may be performed in step 502 or performed separately. Specifically, the RS message sent by the user-side device to the first network node can be carried on an Ethernet frame, and a source MAC address in a frame header of the Ethernet frame can be the MAC address of the user-side device. After receiving the RS message, the first network node needs to extract the source MAC address from the frame header of the Ethernet frame in which the RS message can be located, and then the first network node sends the media access control (MAC) address to the access controller for receiving.

At step 510, the access controller forms a mapping relationship between the first IP address prefix and the MAC address according to the obtained first IP address prefix and the MAC address.

At step 511, the access controller sends a third OpenFlow message to the first network node, where the third OpenFlow message carries the mapping relationship between the first IP address prefix and the MAC address.

At step 512, the first network node generates a mapping relationship table between an IP address prefix and a MAC address according to the third OpenFlow message.

For a PON system, an access loop identifier includes a first access loop identifier of a first network node and a second access loop identifier of a second network node. In this embodiment, it can be assumed that the first network node can be an ONU, and that the second network node can be an OLT. A format of an access loop identifier can be Access-Node-Identifier atm slot1/port1/ONUID/slot2/port2: vpi.vci when the ONU supports a DSL line of an ATM, or Access-Node-Identifier eth slot1/port1/ONUID/slot2/port2[:vlan-id] when the ONU supports an Ethernet DSL/Ethernet line. Access-Node-Identifier can be an identifier of the OLT; slot1/port1 can be one or a combination a chassis (chassis) number, a rack (rack) number, a frame (frame) number, a slot (slot) number, a sub-slot (sub-slot) number, or a port (port) number on the OLT; slot2/port2 can be one or a combination of a chassis (chassis) number, a rack (rack) number, a frame (frame) number, a slot (slot) number, a sub-slot (sub-slot) number, or a port (port) number on the ONU. ONUID/slot2/port2:vpi.vci can be ONU-part Line ID information, and Access-Node-Identifier slot1/port1 can be OLT-part Line ID information. That is, the first access loop identifier can be an ONU-part Line ID, and the second access loop identifier can be an OLT-part Line ID.

Figure 7:
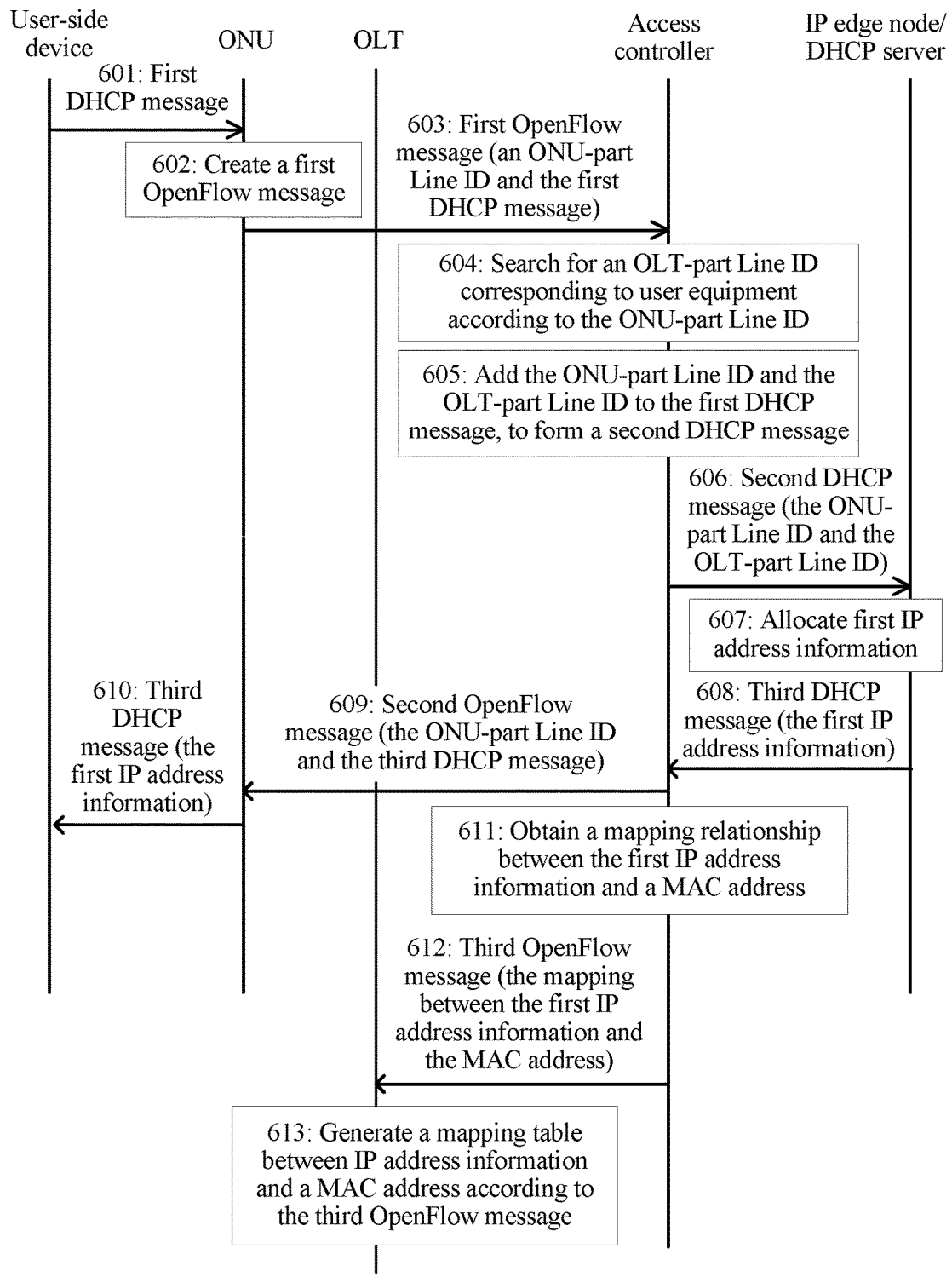
FIG. 7 is a schematic diagram of an implementation form of a message processing method according to an embodiment of the present disclosure.

Then, referring to FIG. 7, FIG. 7 can be a message processing method in a PON system according to an embodiment of the present disclosure. The method includes:

At step 601, a user-side device sends a first DHCP message to an ONU.

At step 602, the ONU creates a first OpenFlow message. OpenFlow extension can be required, so that the first OpenFlow message (such as a packet-in message) carries an ONU-part Line ID and the first DHCP message. Optionally, the first OpenFlow message further carries a MAC address of the user-side device that sends the first DHCP message.

At step 603, the ONU sends the first OpenFlow message to an access controller.

At step 604, the access controller obtains the first DHCP message and the ONU-part Line ID from the first OpenFlow message, and then searches for an OLT-part Line ID corresponding to the user-side device according to the ONU-part Line ID.

At step 605, the access controller adds the ONU-part Line ID and the OLT-part Line ID to the first DHCP message, to form a second DHCP message; or creates a second DHCP message, where the second DHCP message carries the first DHCP message, the ONU-part Line ID, and the OLT-part Line ID.

At step 606, the access controller sends the second DHCP message to an IP edge node/DHCP server.

At step 607, the IP edge node/DHCP server allocates first IP address information according to the ONU-part Line ID and the OLT-part Line ID.

At step 608, the IP edge node/DHCP server sends a third DHCP message to the access controller, where the third DHCP message carries the allocated first IP address information.

At step 609, the access controller sends a second OpenFlow message to the ONU, where the second OpenFlow message carries the ONU-part Line ID and the third DHCP message.

At step 610, the ONU sends the third DHCP message to the user-side device.

Further, the method can include:

The ONU further sends the MAC address of the user-side device to the access controller, which is, for example, performed in step 602 or performed separately.

At step 611, the access controller forms a mapping relationship between the first IP address information and the MAC address according to the obtained first IP address information and the MAC address.

At step 612, the access controller sends a third OpenFlow message to an OLT, where the third OpenFlow message carries the mapping relationship between the first IP address information and the MAC address.

At step 613, the OLT generates a mapping relationship table between IP address information and a MAC address according to the third OpenFlow message.

Figure 8:
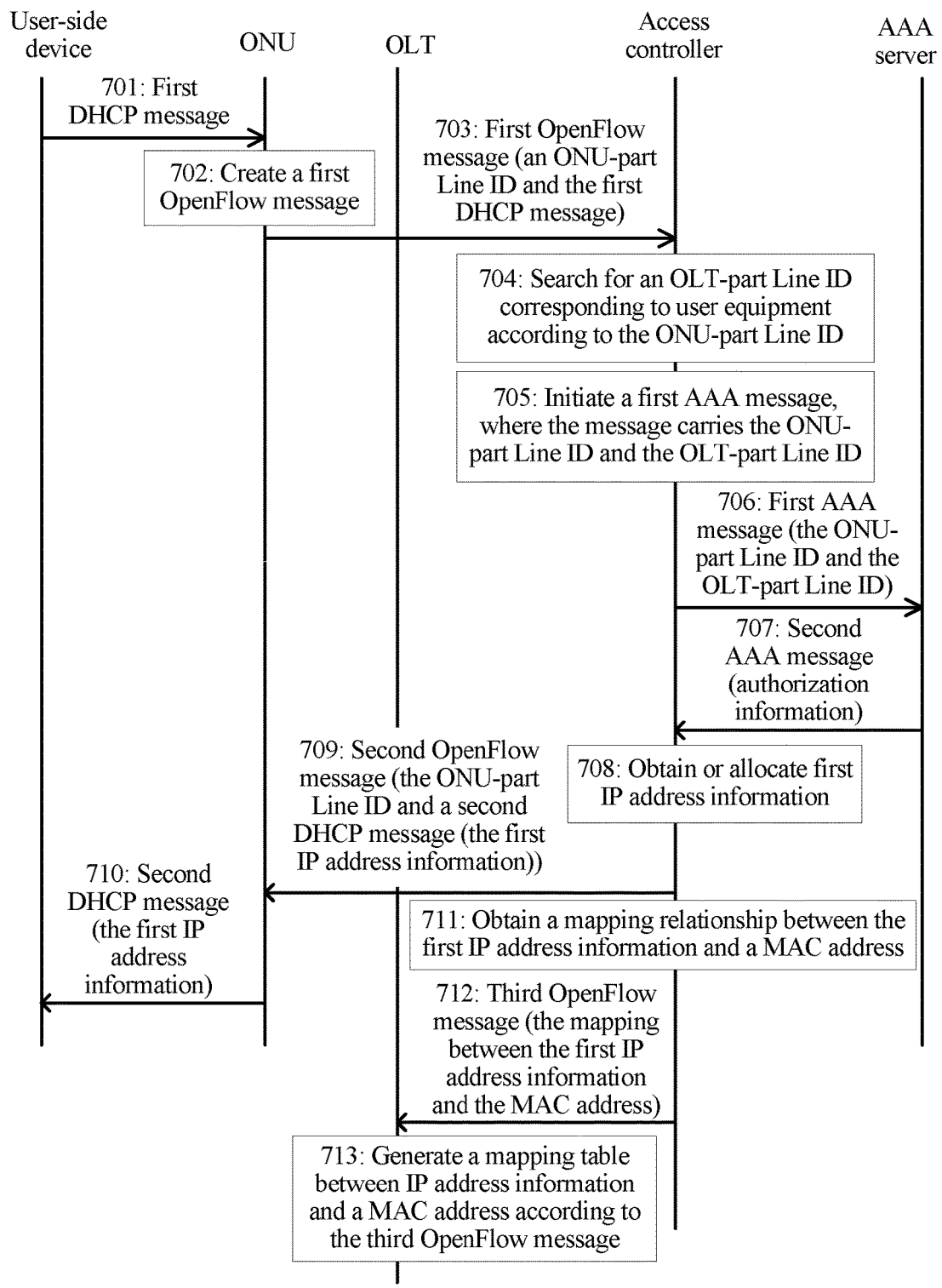
FIG. 8 is a schematic diagram of an implementation form of a message processing method according to an embodiment of the present disclosure.

Then, further referring to FIG. 8, FIG. 8 can be a schematic flowchart of another DHCP message processing method according to an embodiment of the present disclosure. The method includes:

Step 701 to step 704 are the same as step 601 to step 604 in the embodiment in FIG. 7, and details are not described.

At step 705, the access controller initiates a first AAA message, where the message carries the ONU-part Line ID and the OLT-part Line ID.

At step 706, the access controller sends the first AAA message to an AAA server.

At step 707, the AAA server sends a second AAA message to the access controller, where the second AAA message carries authorization information.

At step 708, the access controller obtains or allocates first IP address information according to the authorization information.

At step 709, the access controller sends a second OpenFlow message to the ONU, where the second OpenFlow message carries the ONU-part Line ID and a second DHCP message, and the second DHCP message carries the allocated first IP address information.

At step 710, the ONU sends the second DHCP message to the user-side device.

Further, the method can include: further sending, by the ONU, the MAC address of the user-side device to the access controller, which is, for example, performed in step 702 or performed separately; and step 711 to step 713, where step 711 to step 713 are the same as step 611 to step 613 in the embodiment in FIG. 7, and details are not described herein.

Figure 9:
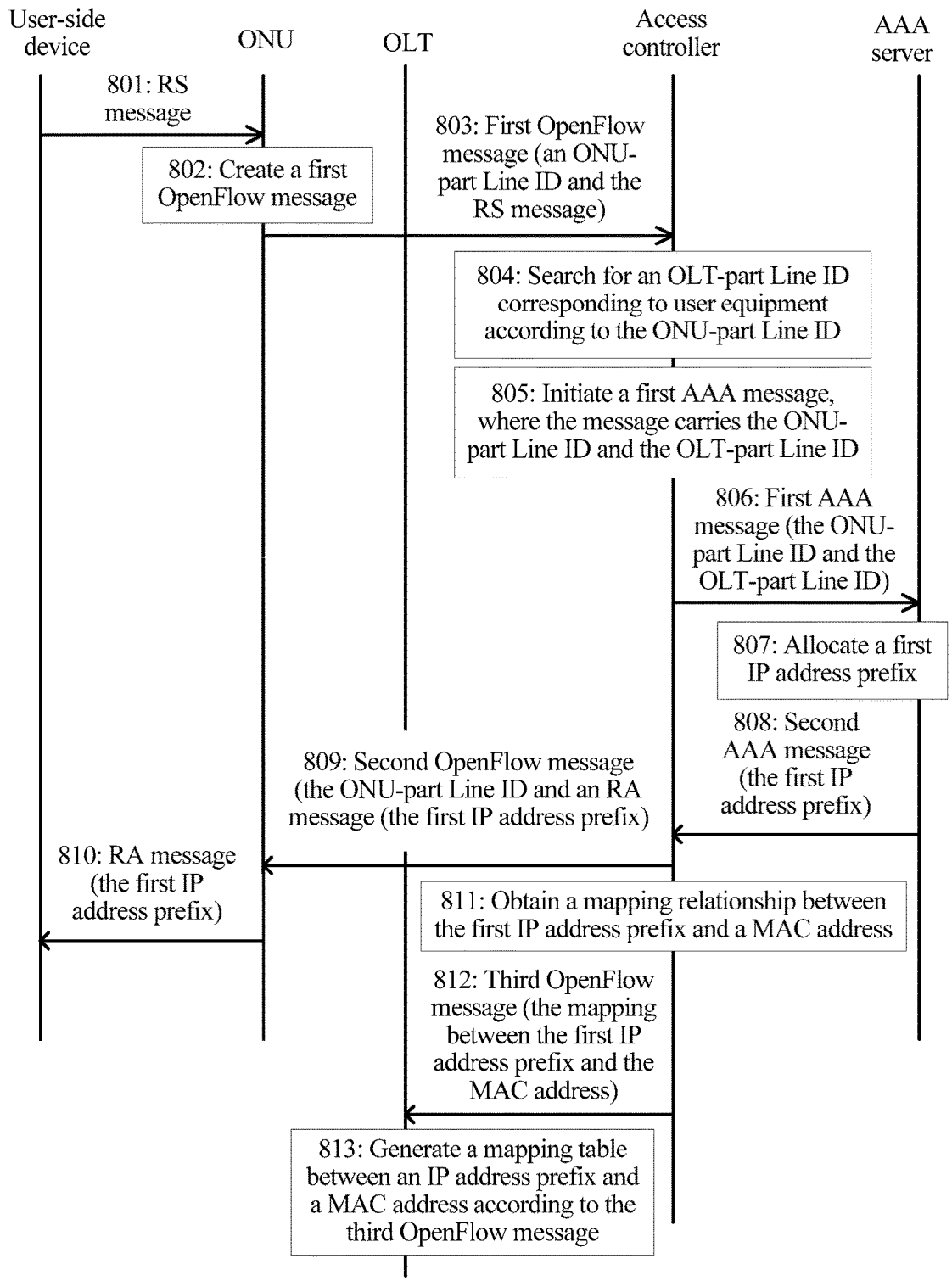
FIG. 9 is a schematic diagram of an implementation form of a message processing method according to an embodiment of the present disclosure.

Further referring to FIG. 9, FIG. 9 is a flowchart of a message processing method in an IPv6 application scenario in a PON network according to an embodiment of the present disclosure. The method includes:

At step 801, a user-side device sends an RS message to an ONU.

At step 802, the ONU creates a first OpenFlow message. OpenFlow extension can be required, so that the first OpenFlow message (such as a packet-in message) carries an ONU-part Line ID and the RS message. Optionally, the first OpenFlow message further carries a MAC address of the user-side device that sends the RS message.

At step 803, the ONU sends the first OpenFlow message to an access controller.

At step 804, the access controller obtains the RS message and the ONU-part Line ID from the first OpenFlow message, and searches for an OLT-part Line ID corresponding to the user-side device according to the ONU-part Line ID.

At step 805, the access controller initiates a first AAA message, where the message carries the ONU-part Line ID and the OLT-part Line ID.

At step 806, the access controller sends the first AAA message to an AAA server.

At step 807, the AAA server allocates a first IP address prefix according to the ONU-part Line ID and the OLT-part Line ID.

At step 808, the AAA server sends a second AAA message to the access controller, where the second AAA message carries the allocated first IP address prefix.

At step 809, the access controller sends a second OpenFlow message to the ONU. OpenFlow extension can be required, so that the second OpenFlow message carries the ONU-part Line ID and an RA message, and the RA message carries the allocated first IP address prefix.

At step 810, the ONU sends the RA message to the user-side device.

Further, the method can include: further sending, by the ONU, the MAC address of the user-side device to the access controller, which is, for example, performed in step 802 or performed separately.

At step 811, the access controller forms a mapping relationship between the first IP address prefix and the MAC address according to the obtained first IP address prefix and the MAC address.

At step 812, the access controller sends a third OpenFlow message to an OLT, where the third OpenFlow message carries the mapping relationship between the first IP address prefix and the MAC address.

At step 813, the OLT generates a mapping relationship table between an IP address prefix and a MAC address according to the third OpenFlow message.

Embodiment 2

Figure 10:
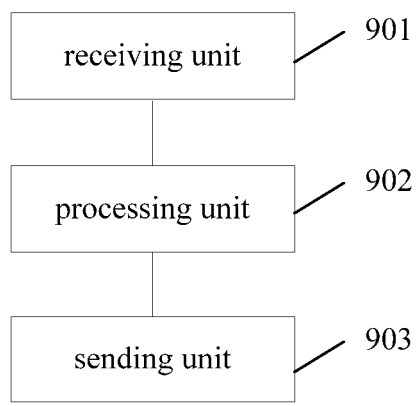
FIG. 10 is a functional block diagram of an access controller according to Embodiment 2 of this application.

An embodiment of this application further provides an access controller. Referring to FIG. 10, the access controller includes: a receiving unit 901, configured to receive a first message used to obtain Internet Protocol (IP) address information for a user-side device and a first access loop identifier of a first network node, where the first message and the first access loop identifier are sent by the first network node, the first access loop identifier may not be carried in the first message, and the IP address information includes an IP address or an IP address prefix; a processing unit 902, where the access controller obtains first IP address information for the user-side device based on the first access loop identifier, where the first IP address information includes a first IP address or a first IP address prefix; and a sending unit 903, configured to send the first IP address information to the first network node, so that the first network node can forward the first IP address information to the user-side device.

Optionally, the sending unit 903 can be further configured to send the first access loop identifier to the first network node, so that the first network node can forward the first IP address information to the user-side device from a physical port corresponding to the first access loop identifier.

In an embodiment, the processing unit 902 can be specifically configured to: send either the first access loop identifier or the first access loop identifier and a second access loop identifier of a second network node to an authentication, authorization and accounting AAA server; receive authorization information sent by the AAA server; and obtain or allocate the first IP address information based on the authorization information, where the second network node and the first network node belong to a same data packet forwarding path, and the second access loop identifier can be determined by the access controller according to the first access loop identifier and a correspondence between the first access loop identifier and the second access loop identifier.

In another embodiment, the processing unit 902 can be specifically configured to send either the first access loop identifier or the first access loop identifier and a second access loop identifier of a second network node to an address allocation node, where the address allocation node includes an IP edge node, a Dynamic Host Configuration Protocol (DHCP) server, or an AAA server, the second network node and the first network node belong to a same data packet forwarding path, and the second access loop identifier can be determined by the access controller according to the first access loop identifier and a correspondence between the first access loop identifier and the second access loop identifier, so that the address allocation node allocates the first IP address information; and receive the first IP address information sent by the address allocation node.

In some implementations, the processing unit 902 can be specifically configured to add either the first access loop identifier or the first access loop identifier and the second access loop identifier to the first message, to form a second message; and send the second message to the address allocation node.

In some implementations, the processing unit 902 can be specifically configured to: create a second message, where the second message carries the first access loop identifier or carries the first access loop identifier and the second access loop identifier; and send the second message to the address allocation node. Types of the first message and the second message may be the same or different.

With reference to the foregoing embodiments, the processing unit 902 can be further specifically configured to search for the second access loop identifier according to the first access loop identifier.

With reference to the foregoing embodiments, the receiving unit 901 can be further specifically configured to receive a media access control (MAC) address of the user-side device that can be sent by the first network node; the processing unit 902 can be further specifically configured to form a mapping relationship between the first IP address information and the MAC address according to the obtained first IP address information and the MAC address; and the sending unit 903 can be further specifically configured to send the mapping relationship between the first IP address information and the MAC address to the first network node or the second network node, so that the first network node or the second network node generates a mapping relationship table between IP address information and a media access control (MAC) address.

With reference to the foregoing embodiments, the first message and the first access loop identifier can be included in an OpenFlow message.

With reference to the foregoing embodiments, the first network node can be an access node (AN), and the user-side device can be customer-premises equipment (CPE); or the first network node can be an optical network unit (ONU), and the user-side device can be CPE; or the first network node can be CPE, and the user-side device can be user equipment (UE) connected to the CPE.

In a product form, the access controller may be embedded in an OLT/BNG device, or may be an independent device.

Various variation manners and specific instances in the message processing methods in the foregoing embodiments of FIG. 1 and FIG. 3 to FIG. 9 are also applicable to the access controller in this embodiment. By means of the foregoing detailed description on the message processing methods, a person skilled in the art may clearly know an implementation method of the access controller in this embodiment, and for ease of brevity in this description, details are not described herein.

Embodiment 3

Figure 11:
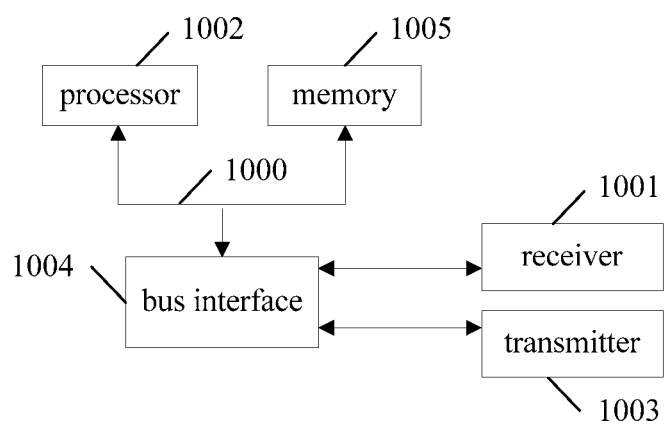
FIG. 11 is a block diagram of a hardware implementation instance of an access controller according to Embodiment 3 of this application.

This embodiment provides an access controller. Referring to FIG. 11, FIG. 11 can be a block diagram of a hardware implementation instance of the access controller. The access controller includes: a receiver 1001, configured to receive a first message used to obtain Internet Protocol (IP) address information for a user-side device and a first access loop identifier of a first network node, where the first message and the first access loop identifier are sent by the first network node, the first access loop identifier may not be carried in the first message, and the IP address information includes an IP address or an IP address prefix; a processor 1002, where the access controller obtains first IP address information for the user-side device based on the first access loop identifier, where the first IP address information includes a first IP address or a first IP address prefix; and a transmitter 1003, configured to send the first IP address information to the first network node, so that the first network node can forward the first IP address information to the user-side device.

Optionally, the transmitter 1003 can be further configured to send the first access loop identifier to the first network node, so that the first network node can forward the first IP address information to the user-side device from a physical port corresponding to the first access loop identifier.

In a bus architecture (indicated by a bus 1000) in FIG. 11, the bus 1000 may include any quantity of interconnected buses and bridges. The bus 1000 connects various circuits including one or more processors 1002 represented by a processor 1002 and a memory represented by a memory 1005. The bus 1000 may further connect various other circuits such as a peripheral device, a voltage stabilizer, and a power management circuit, which are known in the art. Therefore, further description may not be provided herein. A bus interface 1004 provides an interface between the bus 1000 and the receiver 1001 and/or the transmitter 1003. The receiver 1001 and the transmitter 1003 may be a same element, that is, a transceiver, which provides a unit configured to communicate with various other apparatuses on a transmission medium.

The processor 1002 can be responsible for managing the bus 1000 and general processing, and may further provide various functions, including timing, peripheral interfacing, voltage regulation, power management, and another control function. The memory 1005 may be configured to store data used by the processor 1002 executing an operation.

In an embodiment, the processor 1002 can be specifically configured to: send either the first access loop identifier or the first access loop identifier and a second access loop identifier of a second network node to an AAA server; receive authorization information sent by the AAA server; and obtain or allocate the first IP address information based on the authorization information, where the second network node and the first network node belong to a same data packet forwarding path, and the second access loop identifier can be determined by the access controller according to the first access loop identifier and a correspondence between the first access loop identifier and the second access loop identifier.

In another embodiment, the processor 1002 can be specifically configured to: send either the first access loop identifier or the first access loop identifier and a second access loop identifier of a second network node to an address allocation node, so that the address allocation node allocates the first IP address information; and receive the first IP address information sent by the address allocation node, where the second network node and the first network node belong to a same data packet forwarding path, and the second access loop identifier can be determined by the access controller according to the first access loop identifier and a correspondence between the first access loop identifier and the second access loop identifier.

In some implementations, the processor 1002 can be specifically configured to: add either the first access loop identifier or the first access loop identifier and the second access loop identifier to the first message, to form a second message; and send the second message to the address allocation node.

In some implementations, the processor 1002 can be specifically configured to: create a second message, where the second message carries the first access loop identifier or carries the first access loop identifier and the second access loop identifier; and send the second message to the address allocation node. Types of the first message and the second message may be the same or different.

With reference to the foregoing embodiments, the processor 1002 can be further specifically configured to search for the second access loop identifier according to the first access loop identifier.

With reference to the foregoing embodiments, the receiver 1001 can be further specifically configured to receive a Media Access Control (MAC) address of the user-side device that can be sent by the first network node; the processor 1002 can be further specifically configured to form a mapping relationship between the first IP address information and the MAC address according to the obtained first IP address information and the MAC address; and the transmitter 1003 can be further specifically configured to send the mapping relationship between the first IP address information and the MAC address to the first network node or the second network node, so that the first network node or the second network node generates a mapping relationship table between IP address information and a MAC address.

With reference to the foregoing embodiments, the first message and the first access loop identifier can be included in an OpenFlow message.

With reference to the foregoing embodiments, the first network node can be an access node (AN), and the user-side device can be customer-premises equipment (CPE); or the first network node can be an optical network unit (ONU), and the user-side device can be CPE; or the first network node can be CPE, and the user-side device can be user equipment (UE) connected to the CPE.

In a product form, the access controller may be embedded in an OLT/BNG device, or may be an independent device.

Various variation manners and specific instances in the message processing methods in the foregoing embodiments of FIG. 1 and FIG. 3 to FIG. 9 are also applicable to the access controller in this embodiment. By means of the foregoing detailed description on the message processing methods, a person skilled in the art may clearly know an implementation method of the access controller in this embodiment, and for ease of brevity in this description, details are not described herein.

Embodiment 4

Figure 12:
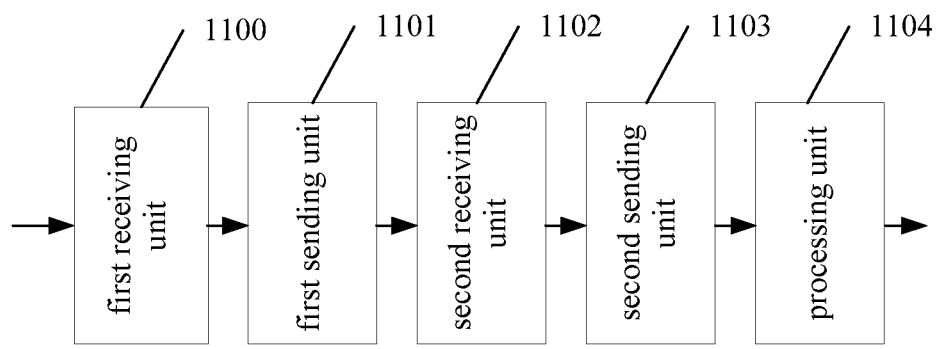
FIG. 12 is a functional block diagram of a network node according to Embodiment 4 of this application.

This embodiment provides a network node, as shown in FIG. 12. In FIG. 12, units are drawn according to a message processing flow, where the network node includes a first receiving unit 1100, configured to receive a first message that can be used to obtain Internet Protocol (IP) address information for a user-side device and can be sent by the user-side device, where the IP address information includes an IP address or an IP address prefix; a first sending unit 1101, configured to send the first message and a first access loop identifier of the network node to an access controller, where the first access loop identifier may not be carried in the first message; a second receiving unit 1102, configured to receive first IP address information that can be obtained for the user-side device and can be sent by the access controller, where the first IP address information includes a first IP address or a first IP address prefix, and the first IP address information can be specifically obtained by the access controller based on the first access loop identifier; and a second sending unit 1103, configured to forward the first IP address information to the user-side device.

Optionally, the second receiving unit 1102 can be further configured to receive the first access loop identifier sent by the access controller, and the second sending unit 1103 can be specifically configured to forward the first IP address information to the user-side device from a physical port corresponding to the first access loop identifier.

In an embodiment, the network node further includes a processing unit 1104, where the first sending unit 1101 can be further specifically configured to send a Media Access Control (MAC) address of the user-side device to the access controller; the second receiving unit 1102 can be further specifically configured to receive a mapping relationship between the first IP address information and the MAC address, where the mapping relationship can be sent by the access controller; and the processing unit 1104 can be specifically configured to generate a mapping relationship table between IP address information and a MAC address.

In another embodiment, the first sending unit 1101 can be further specifically configured to send a MAC address of the user-side device to the access controller, so that the access controller forms a mapping relationship between the first IP address information and the MAC address according to the obtained first IP address information and the MAC address; and send the mapping relationship to a second network node.

With reference to the foregoing embodiments, the first message and the first access loop identifier can be included in an OpenFlow message.

With reference to the foregoing embodiments, the network node can be an access node (AN), and the user-side device can be customer-premises equipment (CPE); or the network node can be an optical network unit (ONU), and the user-side device can be CPE; or the network node can be CPE, and the user-side device can be user equipment (UE) connected to the CPE.

Alternatively, the network node may be specifically a DSLAM, an OLT, an Ethernet switch, an aggregation device, a BNG/BRAS, or the like.

Various variation manners and specific instances in the message processing methods in the foregoing embodiments of FIG. 2 to FIG. 9 are also applicable to the network node in this embodiment. By means of the foregoing detailed description on the message processing methods, a person skilled in the art may clearly know an implementation method of the network node in this embodiment, and for ease of brevity in this description, details are not described herein.

Embodiment 5

Figure 13:
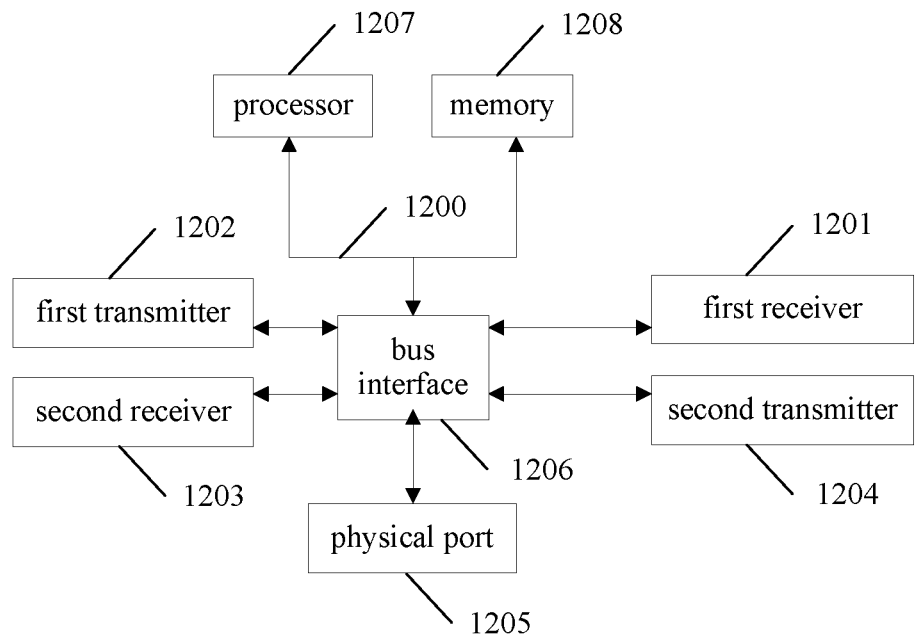
FIG. 13 is a block diagram of a hardware implementation instance of a network node according to Embodiment 5 of this application.

This embodiment provides a network node. Referring to FIG. 13, FIG. 13 is a block diagram of a hardware implementation instance of the network node. The network node includes: a first receiver 1201, configured to receive a first message that can be used to obtain Internet Protocol (IP) address information for a user-side device and can be sent by the user-side device, where the IP address information includes an IP address or an IP address prefix; a first transmitter 1202, configured to send the first message and a first access loop identifier of the network node to an access controller, where the first access loop identifier may not be carried in the first message; a second receiver 1203, configured to receive first IP address information that can be obtained for the user-side device and can be sent by the access controller, where the first IP address information includes a first IP address or a first IP address prefix; and the first IP address information can be specifically obtained by the access controller based on the first access loop identifier; and a second transmitter 1204, configured to forward the first IP address information to the user-side device.

Optionally, the network node further includes a physical port 1205. The second receiver 1203 can be further configured to receive the first access loop identifier sent by the access controller. Therefore, the second transmitter 1204 can be specifically configured to forward the first IP address information to the user-side device from the physical port 1205 corresponding to the first access loop identifier.

In an embodiment, the network node further includes a processor 1207, where the first transmitter 1202 can be further specifically configured to send a Media Access Control (MAC) address of the user-side device to the access controller; the second receiver 1203 can be further specifically configured to receive a mapping relationship between the first IP address information and the MAC address, where the mapping relationship can be sent by the access controller; and the processor 1207 can be specifically configured to generate a mapping relationship table between IP address information and a MAC address.

In another embodiment, the first transmitter 1202 can be further specifically configured to send a MAC address of the user-side device to the access controller, so that the access controller forms a mapping relationship between the first IP address information and the MAC address according to the obtained first IP address information and the MAC address; and send the mapping relationship to a second network node.

In a bus architecture (indicated by a bus 1200) in FIG. 13, the bus 1200 may include any quantity of interconnected buses and bridges. The bus 1200 connects various circuits including one or more processors represented by a processor 1207 and a memory represented by a memory 1208. The bus 1200 may further connect various other circuits such as a peripheral device, a voltage stabilizer, and a power management circuit, which are known in the art. Therefore, further description may not be provided herein. A bus interface 1206 provides an interface between the bus 1200 and the first receiver 1201 and the second transmitter 1204 and between the bus 1200 and the first transmitter 1202 and the second receiver 1203. The first receiver 1201 and the second transmitter 1204 may be a same element, that is, a transceiver, and the first transmitter 1202 and the second receiver 1203 may be a same element, which provides a unit configured to communicate with various other apparatuses on a transmission medium.

The processor 1207 can be responsible for managing the bus 1200 and general processing, and the memory 1208 may be configured to store data used by the processor 1207 executing an operation.

With reference to the foregoing embodiments, the first message and the first access loop identifier can be included in an OpenFlow message.

With reference to the foregoing embodiments, the network node can be an access node (AN), and the user-side device can be customer-premises equipment (CPE); or the network node can be an optical network unit ONU, and the user-side device can be CPE; or the network node can be CPE, and the user-side device can be user equipment (UE) connected to the CPE.

Alternatively, the network node may be specifically a DSLAM, an OLT, an Ethernet switch, an aggregation device, a BNG/BRAS, or the like.

Various variation manners and specific instances in the message processing methods in the foregoing embodiments of FIG. 2 to FIG. 9 are also applicable to the network node in this embodiment. By means of the foregoing detailed description on the message processing methods, a person skilled in the art may clearly know an implementation method of the network node in this embodiment, and for ease of brevity in this description, details are not described herein.

The one or more technical solutions provided in the embodiments of this application have at least the following technical effects or advantages:

In the embodiments of this application, a control function of a network node can be transferred to an access controller. The access controller receives a first message used to obtain IP address information for a user-side device and a first access loop identifier of a first network node, where the first message and the first access loop identifier are sent by the first network node. The access controller obtains first IP address information for the user-side device based on the first access loop identifier. Then, the access controller sends the first access loop identifier and the first IP address information to the first network node, so that the first network node can forward the first IP address information to the user-side device. Therefore, in the embodiments of this application, the first access loop identifier can be processed by the access controller, and the first network node performs only a simple forwarding action, and no longer needs to support a function of processing various messages. In this application, because a control plane function of the network node can be separated out, the network node can be simplified to a simple forwarding device, and no longer needs to support a function of processing various control messages (such as DHCP/RS/RA) related to an IP address or an IP address prefix, thereby implementing decoupling the network node from a service, and reducing operation and maintenance complexity and management costs. Further, the network node can be more simplified, which helps implement high performance of the network node and reuse the network node.

A person skilled in the art should understand that the embodiments of this application may be provided as a method, a system, or a computer program product. Therefore, this application may use a form of hardware only embodiments, software only embodiments, or embodiments with a combination of software and hardware. Moreover, the present disclosure may use a form of a computer program product that can be implemented on one or more computer-usable storage media (including but not limited to a disk memory, an optical memory, and the like) that include computer-usable program code.

This application can be described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions performed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions performed on the computer or the another programmable device provide steps for implementing a specific function in one or more processes in the flowcharts and/or in one or more blocks in the block diagrams.

Finally, it should be noted that the foregoing embodiments are merely intended for describing the technical solutions of the present disclosure, but not for limiting the present disclosure. Although the present disclosure can be described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A message processing method, comprising:
   receiving, by an access controller, a first message used to obtain Internet Protocol (IP) address information for a user-side device and a first access loop identifier of a first network node, wherein the first message and the first access loop identifier are sent by the first network node, the first access loop identifier is omitted from the first message;
   obtaining, by the access controller, a second access loop identifier according to the first access loop identifier and a correspondence between the first access loop identifier and the second access loop identifier;
   generating, by the access controller, an authentication, authorization and accounting (AAA) message, wherein the AAA message further comprises the second access loop identifier of a second network node, the second network node and the first network node belong to a same data packet forwarding path; and
   sending, by the access controller, the AAA message to an AAA server.

2. The method according to claim 1, wherein the method further comprises:

receiving, by the access controller, authentication or authorization information sent by the AAA server;

obtaining or allocating, by the access controller, IP address information based on the authentication or authorization information, wherein the IP address information comprises an IP address or an IP address prefix; and sending, by the access controller, the IP address information to the first network node.

3. The method according to claim 1, wherein the method further comprises:

receiving, by the access controller, a Media Access Control (MAC) address of the user-side device that is sent by the first network node;

forming, by the access controller, a mapping relationship between the IP address information and the MAC address according to the obtained IP address information and the MAC address; and sending, by the access controller, the mapping relationship to the first network node.

4. The method according to any one of claim 1, wherein the first message and the first access loop identifier are comprised in an OpenFlow message.

5. A message processing method, comprising:

receiving, by a first network node, a first message that is used to obtain Internet Protocol (IP) address information for a user-side device and is sent by the user-side device; and sending, by the first network node, the first message and a first access loop identifier of the first network node to an access controller, wherein the first access loop identifier corresponds to a first network node and is not carried in the first message; wherein the access controller obtains an authentication, authorization and accounting (AAA) message according to the first access loop identifier, wherein the AAA message comprises the first access loop identifier; and wherein the AAA message further comprises a second access loop identifier of a second network node, the second network node and the first network node belong to a same data packet forwarding path;

wherein the access controller obtains the second access loop identifier according to the first access loop identifier and a correspondence between the first access loop identifier and the second access loop identifier; and generating the AAA message according to the first access loop identifier and the second access loop identifier.

6. The method according to claim 5, wherein the method further comprises:

receiving, by the first network node, IP address information that is obtained for the user-side device and is sent by the access controller, wherein the IP address information comprises an IP address or an IP address prefix, and the IP address information is obtained by the access controller based on the first access loop identifier; and sending, by the first network node, the IP address information to the user-side device.

7. The method according to claim 5, wherein the method further comprises:

sending, by the first network node, a Media Access Control (MAC) address of the user-side device to the access controller;

receiving, by the first network node, a mapping relationship between the IP address information and the MAC address, wherein the mapping relationship is sent by the access controller; and generating, by the first network node, a mapping relationship table between the IP address information and the MAC address.

8. The method according to claim 5, wherein the first message and the first access loop identifier are comprised in an OpenFlow message.

9. An access controller, comprising:

a receiver, configured to receive a first message used to obtain Internet Protocol (IP) address information for a user-side device and a first access loop identifier of a first network node, wherein the first message and the first access loop identifier are sent by the first network node, the first access loop identifier is omitted from the first message;

at least one processor;

a non-transitory computer-readable storage medium coupled to the processor and storing programming instructions for execution by the at least one processor, the programming instructions instruct the at least one processor to obtain a second access loop identifier according to the first access loop identifier and a correspondence between the first access loop identifier and the second access loop identifier;

generate an authentication, authorization and accounting (AAA) message, wherein the AAA message further comprises the second access loop identifier of a second network node, the second network node and the first network node belong to a same data packet forwarding path; and a transmitter, configured to send the AAA message to an AAA server.

10. The access controller according to claim 9, wherein the receiver is further configured to receive authentication or authorization information sent by the AAA server;

the programming instructions further instruct the processor to obtain or allocate IP address information based on the authentication or authorization information, wherein the IP address information comprises an IP address or an IP address prefix; and the transmitter is further configured to send the IP address information to the first network node.

11. The access controller according to claim 9, wherein the receiver is further configured to receive a Media Access Control (MAC) address of the user-side device that is sent by the first network node;

the programming instructions further instruct the processor to form a mapping relationship between the IP address information and the MAC address according to the obtained IP address information and the MAC address; and the transmitter is further configured to send the mapping relationship to the first network node.

12. A network node, comprising:

a first receiver, configured to receive a first message that is used to obtain Internet Protocol (IP) address information for a user-side device and is sent by the user-side device; and a first transmitter, configured to send the first message and a first access loop identifier of the network node to an access controller, wherein the first access loop identifier is not carried in the first message; wherein the access controller obtains an authentication, authorization and accounting (AAA) message according to the first access loop identifier, wherein the AAA message comprises the first access loop identifier; and wherein the AAA message further comprises a second access loop identifier of a second network node, the second network node and the network node belong to a same data packet forwarding path;

wherein the access controller obtain the second access loop identifier according to the first access loop identifier and a correspondence between the first access loop identifier and the second access loop identifier; and at least one processor, configured to generate the AAA message according to the first access loop identifier and the second access loop identifier.

13. The network node according to claim 12, wherein the network node further comprises:

a second receiver, configured to receive the IP address information obtained for the user-side device, wherein the IP address information comprises an IP address or an IP address prefix, and the IP address information is obtained by the access controller based on the first access loop identifier; and a second transmitter, configured to send the IP address information to the user-side device.

14. The network node according to claim 13, wherein the first transmitter is further configured to send a Media Access Control (MAC) address of the user-side device to the access controller;

the second receiver is further configured to receive a mapping relationship between the IP address information and the MAC address, wherein the mapping relationship is sent by the access controller; and the at least one processor is configured to generate a mapping relationship table between the IP address information and the MAC address.

* * * * *